US009967247B2

(12) United States Patent
Chastain

(10) Patent No.: US 9,967,247 B2
(45) Date of Patent: *May 8, 2018

(54) APPARATUS AND METHOD FOR MANAGING SECURITY DOMAINS FOR A UNIVERSAL INTEGRATED CIRCUIT CARD

(71) Applicant: AT&T INTELLECTUAL PROPERTY I, L.P., Atlanta, GA (US)

(72) Inventor: Walter Cooper Chastain, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/630,181

(22) Filed: Jun. 22, 2017

(65) Prior Publication Data

US 2017/0295158 A1    Oct. 12, 2017

Related U.S. Application Data

(63) Continuation of application No. 14/267,153, filed on May 1, 2014, now Pat. No. 9,713,006.

(51) Int. Cl.
*H04L 29/06* (2006.01)
*G06F 21/10* (2013.01)
*G06F 21/77* (2013.01)

(52) U.S. Cl.
CPC .............. *H04L 63/08* (2013.01); *G06F 21/10* (2013.01); *G06F 21/77* (2013.01)

(58) Field of Classification Search
CPC .......... H04L 63/08; H04L 9/32; H04W 12/06; H06F 21/30; G07F 7/1008
See application file for complete search history.

(56) References Cited

U.S. PATENT DOCUMENTS

| | | | |
|---|---|---|---|
| 5,530,757 | A | 6/1996 | Krawczyk |
| 5,742,910 | A | 4/1998 | Gallant et al. |

(Continued)

FOREIGN PATENT DOCUMENTS

| | | |
|---|---|---|
| AU | 2010315111 A1 | 6/2012 |
| CA | 2535102 C | 5/2011 |

(Continued)

OTHER PUBLICATIONS

"The Standard for Managing Applications on Secure Chip Technology," Interactive web site http://www.globalplatform.org/ Disclosing standards for GlobalPlatform chips—see tabs on "Specifications" and "Compliance", 1 pg., 2014.

(Continued)

*Primary Examiner* — Khoi Le
(74) *Attorney, Agent, or Firm* — Guntin & Gust, PLC; David Terrell

(57) ABSTRACT

A device that incorporates the subject disclosure may perform, for example, generating a security domain root structure for a universal integrated circuit card of an end user device, where the security domain root structure includes a hierarchy of a link provider operator security domain above a mobile network operator trusted security domain, where the link provider operator security domain enables transport management by a link provider operator, and where the mobile network operator trusted security domain enables card content management and subscription eligibility verification by a mobile network operator trusted service manager. Other embodiments are disclosed.

20 Claims, 16 Drawing Sheets

(56) References Cited

U.S. PATENT DOCUMENTS

| | | | |
|---|---|---|---|
| 5,774,544 A | 6/1998 | Lee et al. | |
| 6,005,942 A | 12/1999 | Chan et al. | |
| 6,014,561 A | 1/2000 | Moelne | |
| 6,151,677 A | 11/2000 | Walter et al. | |
| 6,850,252 B1 | 2/2005 | Hoffberg | |
| 6,892,301 B1 | 5/2005 | Hansmann et al. | |
| 6,922,200 B1 | 7/2005 | Marques et al. | |
| 7,165,173 B1 | 1/2007 | Herle | |
| 7,185,362 B2 | 2/2007 | Hawkes et al. | |
| 7,239,704 B1 | 7/2007 | Maillard et al. | |
| 7,257,844 B2 | 8/2007 | Woodward et al. | |
| 7,269,732 B2 | 9/2007 | Kilian-Kehr | |
| 7,346,586 B1 | 3/2008 | Walmsley et al. | |
| 7,382,881 B2 | 6/2008 | Uusitalo et al. | |
| 7,454,233 B2 | 11/2008 | Lu et al. | |
| 7,472,123 B2 | 12/2008 | Hamatsu | |
| 7,480,907 B1 | 1/2009 | Marolia et al. | |
| 7,486,810 B1 | 2/2009 | Accapadi et al. | |
| 7,499,960 B2 | 3/2009 | Dageville et al. | |
| 7,606,560 B2 | 10/2009 | Labrou et al. | |
| 7,715,823 B2 | 5/2010 | Bravo et al. | |
| 7,751,567 B2 | 7/2010 | Quick, Jr. et al. | |
| 7,882,208 B2 | 2/2011 | Akashika et al. | |
| 7,917,751 B2 | 3/2011 | Keohane et al. | |
| 7,933,591 B2 | 4/2011 | Blom et al. | |
| 7,953,391 B2 | 5/2011 | Lee et al. | |
| 8,027,472 B2 | 9/2011 | Aissi et al. | |
| 8,032,756 B2 | 10/2011 | Inami | |
| 8,037,522 B2 | 10/2011 | Holtmanns et al. | |
| 8,055,910 B2 | 11/2011 | Kocher et al. | |
| 8,064,598 B2 | 11/2011 | Vaha-Sipila et al. | |
| 8,098,818 B2 | 1/2012 | Grilli et al. | |
| 8,165,635 B2 | 4/2012 | Khan et al. | |
| 8,166,524 B2 | 4/2012 | Sentinelli | |
| 8,186,591 B2 | 5/2012 | Jolivet | |
| 8,213,612 B2 | 7/2012 | Kaabouch et al. | |
| 8,244,181 B2 | 8/2012 | Shuo | |
| 8,260,259 B2 | 9/2012 | Semple et al. | |
| 8,271,025 B2 | 9/2012 | Brisebois et al. | |
| 8,307,410 B2 | 11/2012 | Martin et al. | |
| 8,333,321 B2 | 12/2012 | Gressel et al. | |
| 8,335,921 B2 | 12/2012 | von Behren et al. | |
| 8,346,287 B2 | 1/2013 | King et al. | |
| 8,380,171 B2 | 2/2013 | Link et al. | |
| 8,387,119 B2 | 2/2013 | Patel et al. | |
| 8,391,837 B2 | 3/2013 | Corda | |
| 8,406,758 B2 | 3/2013 | Snijder et al. | |
| 8,417,952 B2 | 4/2013 | Cheng et al. | |
| 8,429,708 B1* | 4/2013 | Tandon | G06F 21/00 380/247 |
| 8,452,012 B2 | 5/2013 | Aissi et al. | |
| 8,483,261 B2 | 7/2013 | Seo et al. | |
| 8,494,908 B2 | 7/2013 | Herwig et al. | |
| 8,495,213 B2 | 7/2013 | Deprun et al. | |
| 8,503,376 B2 | 8/2013 | Cha et al. | |
| 8,505,085 B2 | 8/2013 | Logan et al. | |
| 8,510,553 B2 | 8/2013 | Adrangi et al. | |
| 8,510,559 B2 | 8/2013 | Guccione et al. | |
| 8,533,803 B2 | 9/2013 | Cha et al. | |
| 8,543,814 B2 | 9/2013 | Laitinen et al. | |
| 8,554,222 B2 | 10/2013 | Yang et al. | |
| 8,606,319 B2* | 12/2013 | Ali | H04W 4/003 455/558 |
| 8,625,800 B2 | 1/2014 | Jooste et al. | |
| 8,738,898 B2 | 5/2014 | Herwono et al. | |
| 8,776,189 B2 | 7/2014 | Jain | |
| 8,799,451 B2 | 8/2014 | Raleigh et al. | |
| 8,799,932 B2 | 8/2014 | Prevost et al. | |
| 8,814,051 B2 | 8/2014 | Millet et al. | |
| 8,837,449 B2 | 9/2014 | Chen et al. | |
| 9,106,628 B2 | 8/2015 | Kolesnikov et al. | |
| 9,130,972 B2 | 9/2015 | Barkan et al. | |
| 9,185,089 B2* | 11/2015 | Khan | H04L 63/062 |
| 9,301,145 B2 | 3/2016 | Merrien et al. | |
| 9,442,833 B1 | 9/2016 | Johansson et al. | |
| 9,521,126 B2 | 12/2016 | Boelter et al. | |
| 2001/0029581 A1 | 10/2001 | Knauft et al. | |
| 2002/0003892 A1 | 1/2002 | Iwanaga et al. | |
| 2002/0040936 A1 | 4/2002 | Wentker et al. | |
| 2002/0174071 A1 | 11/2002 | Boudou et al. | |
| 2002/0188855 A1 | 12/2002 | Nakayama et al. | |
| 2003/0129965 A1 | 7/2003 | Siegel | |
| 2003/0186722 A1 | 10/2003 | Weiner | |
| 2004/0240671 A1 | 12/2004 | Hu et al. | |
| 2005/0002407 A1 | 1/2005 | Shaheen et al. | |
| 2005/0120248 A1 | 6/2005 | Medvinsky et al. | |
| 2005/0202803 A1 | 9/2005 | Mahalal | |
| 2005/0259673 A1 | 11/2005 | Lu et al. | |
| 2005/0278787 A1 | 12/2005 | Naslund et al. | |
| 2006/0079284 A1 | 4/2006 | Lu et al. | |
| 2006/0085848 A1 | 4/2006 | Aissi et al. | |
| 2006/0101270 A1 | 5/2006 | Laitinen | |
| 2006/0130128 A1 | 6/2006 | Gorancic et al. | |
| 2006/0165060 A1 | 7/2006 | Dua | |
| 2006/0205387 A1 | 9/2006 | Laitinen et al. | |
| 2006/0206710 A1 | 9/2006 | Gehrmann | |
| 2006/0242064 A1 | 10/2006 | Jogand-Coulomb et al. | |
| 2006/0269061 A1 | 11/2006 | Balasubramanian et al. | |
| 2006/0289659 A1 | 12/2006 | Mizushima et al. | |
| 2007/0050365 A1 | 3/2007 | Laitinen et al. | |
| 2007/0101122 A1 | 5/2007 | Guo | |
| 2007/0239857 A1 | 10/2007 | Mahalal et al. | |
| 2007/0294744 A1 | 12/2007 | Alessio et al. | |
| 2007/0299780 A1 | 12/2007 | Vanska et al. | |
| 2008/0005559 A1 | 1/2008 | Johnson | |
| 2008/0010470 A1 | 1/2008 | McKeon et al. | |
| 2008/0080399 A1 | 4/2008 | Wang et al. | |
| 2008/0155257 A1 | 6/2008 | Werner et al. | |
| 2008/0194296 A1 | 8/2008 | Roundtree et al. | |
| 2008/0276090 A1 | 11/2008 | Merrien et al. | |
| 2008/0294891 A1 | 11/2008 | Ram Ov et al. | |
| 2008/0301433 A1 | 12/2008 | Vito | |
| 2008/0304458 A1 | 12/2008 | Aghvami et al. | |
| 2009/0077643 A1 | 3/2009 | Schmidt et al. | |
| 2009/0116642 A1 | 5/2009 | Yang | |
| 2009/0163235 A1 | 6/2009 | Michaels et al. | |
| 2009/0191857 A1 | 7/2009 | Horn et al. | |
| 2009/0220091 A1 | 9/2009 | Howard | |
| 2009/0288012 A1 | 11/2009 | Hertel et al. | |
| 2009/0291712 A1 | 11/2009 | Park et al. | |
| 2009/0313472 A1 | 12/2009 | Guccione et al. | |
| 2009/0327138 A1 | 12/2009 | Mardani et al. | |
| 2010/0037230 A1 | 2/2010 | Potonniee et al. | |
| 2010/0048169 A1 | 2/2010 | Yan et al. | |
| 2010/0062808 A1* | 3/2010 | Cha | G06Q 20/3229 455/558 |
| 2010/0159878 A1 | 6/2010 | Kim et al. | |
| 2010/0185874 A1 | 7/2010 | Robles et al. | |
| 2010/0197350 A1 | 8/2010 | Jeung | |
| 2010/0255819 A1 | 10/2010 | Robles et al. | |
| 2010/0281251 A1 | 11/2010 | Arauz Rosado | |
| 2010/0287375 A1 | 11/2010 | Lee et al. | |
| 2010/0299731 A1 | 11/2010 | Atkinson | |
| 2010/0306531 A1 | 12/2010 | Nahari | |
| 2010/0315346 A1 | 12/2010 | Lindroos et al. | |
| 2011/0003580 A1 | 1/2011 | Belrose et al. | |
| 2011/0007899 A1 | 1/2011 | Park et al. | |
| 2011/0035584 A1 | 2/2011 | Meyerstein et al. | |
| 2011/0087610 A1* | 4/2011 | Batada | G06F 21/72 705/318 |
| 2011/0093913 A1 | 4/2011 | Wohlert et al. | |
| 2011/0158090 A1 | 6/2011 | Riley et al. | |
| 2011/0191597 A1 | 8/2011 | Grall et al. | |
| 2011/0208600 A1 | 8/2011 | Aharoni et al. | |
| 2011/0211699 A1* | 9/2011 | Ma | H04L 9/0819 380/278 |
| 2011/0265159 A1 | 10/2011 | Ronda et al. | |
| 2011/0269423 A1 | 11/2011 | Schell et al. | |
| 2011/0275364 A1 | 11/2011 | Austin et al. | |
| 2011/0296182 A1 | 12/2011 | Jia et al. | |
| 2011/0302017 A1 | 12/2011 | Marti et al. | |
| 2011/0302408 A1 | 12/2011 | McDermott et al. | |
| 2012/0027209 A1 | 2/2012 | Aissi et al. | |
| 2012/0028609 A1 | 2/2012 | Hruska | |

(56) References Cited

U.S. PATENT DOCUMENTS

| | | |
|---|---|---|
| 2012/0036042 A1 | 2/2012 | Graylin et al. |
| 2012/0047237 A1 | 2/2012 | Arvidsson et al. |
| 2012/0047563 A1 | 2/2012 | Wheeler et al. |
| 2012/0066504 A1 | 3/2012 | Hird et al. |
| 2012/0072979 A1 | 3/2012 | Cha et al. |
| 2012/0096513 A1 | 4/2012 | Raleigh et al. |
| 2012/0102557 A1 | 4/2012 | Felton et al. |
| 2012/0108205 A1 | 5/2012 | Schell et al. |
| 2012/0108213 A1 | 5/2012 | Kasargod et al. |
| 2012/0130838 A1 | 5/2012 | Koh et al. |
| 2012/0142332 A1 | 6/2012 | Li |
| 2012/0144201 A1 | 6/2012 | Anantha et al. |
| 2012/0159105 A1 | 6/2012 | von Behren et al. |
| 2012/0159163 A1* | 6/2012 | von Behren ....... G06Q 20/3552 713/168 |
| 2012/0171992 A1* | 7/2012 | Cheong ................. H04L 63/067 455/410 |
| 2012/0172016 A1 | 7/2012 | Veneroso et al. |
| 2012/0172089 A1 | 7/2012 | Bae et al. |
| 2012/0185661 A1 | 7/2012 | Desai et al. |
| 2012/0187184 A1 | 7/2012 | Challa et al. |
| 2012/0190354 A1 | 7/2012 | Merrien et al. |
| 2012/0208597 A1 | 8/2012 | Billman |
| 2012/0231844 A1 | 9/2012 | Coppinger et al. |
| 2012/0233685 A1 | 9/2012 | Palanigounder et al. |
| 2012/0246476 A1 | 9/2012 | Zhuang et al. |
| 2012/0259849 A1 | 10/2012 | Deodhar et al. |
| 2012/0266220 A1 | 10/2012 | Brudnicki et al. |
| 2012/0311563 A1 | 12/2012 | Lee et al. |
| 2012/0317261 A1 | 12/2012 | Ahmavaara et al. |
| 2012/0331292 A1* | 12/2012 | Haggerty ............ H04L 63/0272 713/168 |
| 2013/0012168 A1 | 1/2013 | Rajadurai et al. |
| 2013/0023235 A1 | 1/2013 | Fan et al. |
| 2013/0024383 A1 | 1/2013 | Kannappan et al. |
| 2013/0041830 A1 | 2/2013 | Singh et al. |
| 2013/0067232 A1 | 3/2013 | Cheung et al. |
| 2013/0074163 A1 | 3/2013 | Murakami et al. |
| 2013/0111546 A1* | 5/2013 | Gargiulo ................... H04L 9/32 726/1 |
| 2013/0117824 A1 | 5/2013 | Naslund et al. |
| 2013/0139230 A1 | 5/2013 | Koh et al. |
| 2013/0145455 A1 | 6/2013 | Vijayshankar et al. |
| 2013/0152208 A1 | 6/2013 | King et al. |
| 2013/0166595 A1 | 6/2013 | Meketa et al. |
| 2013/0173759 A1 | 7/2013 | Herse et al. |
| 2013/0203465 A1 | 8/2013 | Ali et al. |
| 2013/0212660 A1 | 8/2013 | Neafsey et al. |
| 2013/0223623 A1 | 8/2013 | Jooste et al. |
| 2013/0262317 A1 | 10/2013 | Collinge et al. |
| 2013/0272714 A1 | 10/2013 | Ohkubo |
| 2013/0273889 A1* | 10/2013 | Lobmaier ............ H04W 12/00 455/411 |
| 2013/0291084 A1 | 10/2013 | Amiel et al. |
| 2013/0329683 A1 | 12/2013 | Gachon et al. |
| 2013/0333015 A1 | 12/2013 | Reynolds et al. |
| 2013/0344857 A1 | 12/2013 | Berionne et al. |
| 2014/0013406 A1 | 1/2014 | Tremlet et al. |
| 2014/0018041 A1 | 1/2014 | Summerer et al. |
| 2014/0040633 A1 | 2/2014 | Leleu |
| 2014/0045462 A1 | 2/2014 | Warnez |
| 2014/0057680 A1 | 2/2014 | Proust et al. |
| 2014/0066019 A1 | 3/2014 | Waters et al. |
| 2014/0073375 A1 | 3/2014 | Li et al. |
| 2014/0101449 A1 | 4/2014 | Trujillo Gonzalez et al. |
| 2014/0189880 A1* | 7/2014 | Funk ........................ G06F 21/62 726/27 |
| 2014/0215589 A1 | 7/2014 | Dietrich et al. |
| 2014/0243022 A1 | 8/2014 | L'Heriteau et al. |
| 2014/0281498 A1 | 9/2014 | Bransom et al. |
| 2014/0317686 A1 | 10/2014 | Vetillard et al. |
| 2014/0324698 A1* | 10/2014 | Dolcino ............ G06Q 20/3227 705/44 |
| 2014/0337234 A1 | 11/2014 | Brewer et al. |
| 2014/0373117 A1 | 12/2014 | Le |
| 2014/0380056 A1 | 12/2014 | Buckley et al. |
| 2015/0017910 A1 | 1/2015 | Li |
| 2015/0106456 A1* | 4/2015 | van Hoek ............... H04W 4/12 709/206 |
| 2015/0249658 A1 | 9/2015 | Lee et al. |
| 2016/0006762 A1 | 1/2016 | Dumoulin et al. |
| 2016/0182512 A1 | 6/2016 | Chastain et al. |
| 2016/0323111 A1 | 11/2016 | Chastain et al. |
| 2016/0323255 A1 | 11/2016 | Chastain et al. |
| 2016/0381555 A1 | 12/2016 | Chastain |
| 2017/0118185 A1 | 4/2017 | Chastain et al. |
| 2017/0180366 A1 | 6/2017 | Chastain et al. |

FOREIGN PATENT DOCUMENTS

| | | |
|---|---|---|
| CA | 2823685 A1 | 2/2012 |
| EP | 1377091 B1 | 12/2005 |
| EP | 1257922 B1 | 6/2006 |
| EP | 1865437 A2 | 12/2007 |
| EP | 1480476 B1 | 10/2008 |
| EP | 2041913 A1 | 4/2009 |
| EP | 2074741 A1 | 7/2009 |
| EP | 2113856 A1 | 11/2009 |
| EP | 2210436 A1 | 7/2010 |
| EP | 2223252 A1 | 9/2010 |
| EP | 2461613 A1 | 6/2012 |
| EP | 2641206 A1 | 9/2013 |
| KR | 2013027097 | 3/2013 |
| WO | 2002063517 | 8/2002 |
| WO | 03046719 A2 | 6/2003 |
| WO | WO2003046719 | 6/2003 |
| WO | 2007079636 A1 | 7/2007 |
| WO | WO2007079636 | 7/2007 |
| WO | 2008059353 A1 | 5/2008 |
| WO | 2008149196 A1 | 12/2008 |
| WO | WO2009/046400 | 4/2009 |
| WO | 2009/126647 | 10/2009 |
| WO | 2010027765 A2 | 3/2010 |
| WO | WO2010051715 | 5/2010 |
| WO | WO2011/115407 | 9/2011 |
| WO | 2012065829 A1 | 5/2012 |
| WO | 2012110880 A1 | 8/2012 |
| WO | 2012151571 A2 | 11/2012 |
| WO | 2013006116 A2 | 1/2013 |
| WO | 2013/036009 | 3/2013 |
| WO | 2013098117 A1 | 7/2013 |
| WO | 2013/050296 | 11/2013 |

OTHER PUBLICATIONS

Barriga, et al., "M2M Remote-Subscription Management," Ericsson Review, ericsson.com, 6 pgs., 2011.

Bernabeu, "Liberty ID-WSF Advanced Client Implementation and Deployment guidelines for SIM/UICC Card environment," Liberty Alliance Project Version 1.0, 18 pgs., 2009.

Chun-Ze, "Study and implementation of UICC security features," Journal of Chongqing University of Posts and Telecommunications (Natural Science Edition) 1 pg., 2006.

Edlund, Lasse, "Secure and confidential application on UICC" KTH Computer Science and Communication Master of Science Thesis Stockholm, Sweden, 44 pgs., 2009.

Lamotte, Thierry, "IP Smart Cards in the (Not So) Distant Future," ETSI Project Smart Card Platform Meeting Gemplus Research Lab Paper, 18 pgs., Mar. 15, 2001.

Leicher, "An Identity Provider using a Secure Element of a Phone: Smart Card Based OpenID," 14 pgs., 2012.

Meyerstein, "Security Aspects of Smart Cards vs. Embedded Security in Machine-to-Machine (M2M) Advanced Mobile Network Applications," Security and Privacy in Mobile Information and Communication Systems Lecture Notes of the Institute for Computer Sciences, Social Info.

"Mobile/NFC Security Fundamentals Secure Elements 101" Smart Card Alliance Webinar Mar. 28, 2013.

"Over-The-Air Platform Security Review", Mandiant Intelligent Information Security, 6 pgs., Aug. 17, 2010.

(56) References Cited

OTHER PUBLICATIONS

"The OTA Platform in the World of LTE", 14 pgs., Jan. 2011.
"3rd Generation Partnership Project; Technical Specification Group Core Network and Terminals; Characteristics of the Universal Subscriber Identity Module (USIM) application", Release 11, 2012.
"GlobalPlatform Card Specification", Version 2.2.1, 2011.
"GlobalPlatform Card Technology Secure Channel Protocol 03 Card Specification v 2.2—Amendment D", 2009.
"GlobalPlatform Device Secure Element Remote Application Management", May 2011.
"GlobalPlatform Device Technology Secure Element Access Control", Version 1.0, May 2012.
"GlobalPlatform Device Technology TEE System Architecture", Dec. 2011.
"GlobalPlatform Key Management System", Functional Requirements, Nov. 2003.
"GlobalPlatform System Messaging Specification for Management of Mobile-NFC Services", Feb. 2011.
"Reprogrammable SIMs: Technology, Evolution and Implications", csmg, Sep. 25, 2012.
"3rd Generation Partnership Project; Technical Specification Group Core Network and Terminals; Remote APDU Structure for (U)SIM Toolkit applications", Release 10, 2012.
"3rd Generation Partnership Project; Technical Specification Group Core Network and Terminals; Secured packet structure for (Universal) Subscriber Identity Module (U)SIM Toolkit applications", Release 10, 2012.
"3rd Generation Partnership Project; Technical Specification Group Core Network and Terminals; UICC-terminal interface; Physical and logical characteristics", Release 10, 2011.
"3rd Generation Partnership Project; Technical Specification Group Core Network and Terminals; Universal Subscriber Identity Module (USIM) Application Toolkit (USAT)", Release 11, 2012.
"GlobalPlatform Card Confidential Card Content Management Card Specification v2.2—Amendment A", 2011.
"GlobalPlatform Card Contactless Services Card Specification v2.2—Amendment C", 2012.
"GlobalPlatform Card Remote Application Management over HTTP Card Specification v2.2—Amendment B", 2012.
"GlobalPlatform Card Security Upgrade for Card Content Management Card Specification v 2.2—Amendment E", 2011.
"Smart Cards; UICC Application Programming Interface (UICC API) for Java Card™", Release 9, 2012.
"Smart Cards; UICC-Terminal Interface; Physical and logical characteristics", Release 10, 2011, 179 pages.
"Universal Mobile Telecommunications System (UMTS); UICC-terminal interface; Physical and logical characteristics", Release 10, 2011.
Chen, "An efficient end-to-end security mechanism for IP multimedia subsystem", Computer Communications, 2008, vol. 31.18, pp. 4259-4268.
Dodson, Ben et al., "Snap2Pass: Consumer-Friendly Challenge-Response Authentication with a Phone", http://prpl.stanford.edu/papers/soups10j.pdf, Apr. 30, 2010.
Ericsson, "The OTA Platform in the World of LTE". Giesecke & Devrient, Jan. 2011.
Farhat, Farshid et al., "Private Identification, Authentication and Key Agreement Protocol with Security Mode Setup", Iran Telecommunication Research Center, https://eprint.iacr.org/2011/045.pdf, Apr. 2011, 21 pages.
Global Platform, "Secure Element Remote Application Management", Version 1.0, May 2011.
"Reprogrammable SIMs: Technology, Evolution and Implications Final Report", CSMG-Global, Sep. 25, 2012, 1-95.
"Secure Authentication for Mobile Internet Services", Sim Alliance, http://simalliance.org/wp-content/uploads/2015/03/12-01-01-WP_SIMallianceSecureAuthentication-EN-V1.1.pdf, Dec. 2011, 1-23.
"Smart Cards; Card Application Tookit (CAT)", Release 11, 2012.
"Smart Cards; ETSI numbering system for telecommunication application providers", Release 11, 2011.
"Smart Cards; Machine to Machine UICC; Physical and logical characteristics", Release 9, 2011.
"Smart Cards; Remote APDU structure for UICC based applications", Release 11, 2012.
"Smart Cards; Secured packet structure for UICC based applications", Release 11, 2012.
"Smart Cards; Security mechanisms for UICC based Applications—Functional requirements", Release 8, 2008.
Nagalakshmi, et al., "Modified Protocols for Internet Key Exchange (IKE) Using Public Encryption and Signature Keys", Information Technology: New Generations (ITNG), 2011 Eighth International Conference on, 2011, pp. 376, 381.
Nakarmi, Prajwol K., "Evaluation of VoIP Security for Mobile Devices," KTH Royal Institute of Technology, Master's Thesis, Stockholm, 82 pgs. Jun. 16, 2011.
Nelenkov, "Using the SIM card as a secure element in Android", http//nelenkov.blogspot.com/2013/09/using-sim-card-as-secure-element.ntml, 11 pgs., 2013.
Sher, "Secure service provisioning (SSP) framework for IP multimedia subsystem (IMS)", Technical University of Berlin Doctoral thesis, 225 pgs., Dec. 14, 2007.
Siddiqi, "Smart Card Packaging Process Control System," KTH Royal Insitute of Technology School of Information and Communication Technology Stockholm, Sweden Masters Thesis, 102 pgs., Aug. 1, 2012.
Zhang, et al., "Cryptographic Key Agreement Protocol Simulation", Semantics Knowledge and Grid (SKG), 2010 Sixth International Conference on, 2010, pp. 418, 419.
Huang, et al., "IC activation and user authentication for security-sensitive systems", IEEE 10.1109/HST.2008.4559056, 2008.
Imhontu, et al., "A survey on near field communication in mobile phones & PDAs", Dissertation Halmstad University, 2010. http://hh.diva-portal.org/smash/get/diva2:385433/FULLTEXT01.
Kim, Jong-Min et al., "A Study of Coupons issuance System Considering of User Convenience Based on NFC", 3rd International Conference on Computer Science and Information Technology (ICCSIT'2013) Jan. 4-5, 2013 Bali (Indonesia). http://psrcentre.org/images/extraimages/113118.pdf.
Kounelis, Ioannis et al., "Secure Middleware for Mobile Phones and UICC Applications", Mobile Wireless Middleware, Operating Systems, and Applications, Springer Berlin Heidelberg, 2012, 143-152.
Kounelis, Ioannis et al., "Security of service requests for cloud based m-commerce", MIPRO, 2012 Proceedings of the 35th International Convention, IEEE, 2012.
Lunde, Lars et al., "Using SIM for strong end-to-end Application Authentication," NTNU Innovation and Creativity, Master of Science in Communication Technology, 170 pgs., May 2006.
Meyerstein, et al., "Security Aspects of Smart Cards vs. Embedded Security in Machine-to-Machine (M2M) Advanced Mobile Network Applications", InterDigital Communications Corporation LLC, First International ICST Conference: MobiSec 2009, Security and Privacy in Mobile Information and Communication Systems, p. 214-225, Jun. 3-5, 2009.

* cited by examiner

100

300

400

500

600

700

800

900

1100

1200

ND METHOD FOR
APPARATUS AND METHOD FOR MANAGING SECURITY DOMAINS FOR A UNIVERSAL INTEGRATED CIRCUIT CARD

CROSS-REFERENCE TO RELATED APPLICATIONS

This application is a Continuation of and claims priority to U.S. application Ser. No. 14/267,153 filed May 1, 2014. The contents of the foregoing application is hereby incorporated by reference into this application as if set forth herein in full.

FIELD OF THE DISCLOSURE

The subject disclosure relates to an apparatus and method for managing security domains for a universal integrated circuit card.

BACKGROUND

Electronic devices are being utilized with more frequency to store data and distribute the data to other devices. The data can often be private or confidential, and users desire to have confidence that communications with other devices or systems remain secure.

BRIEF DESCRIPTION OF THE DRAWINGS

Reference will now be made to the accompanying drawings, which are not necessarily drawn to scale, and wherein.

DETAILED DESCRIPTION

Figure 1:
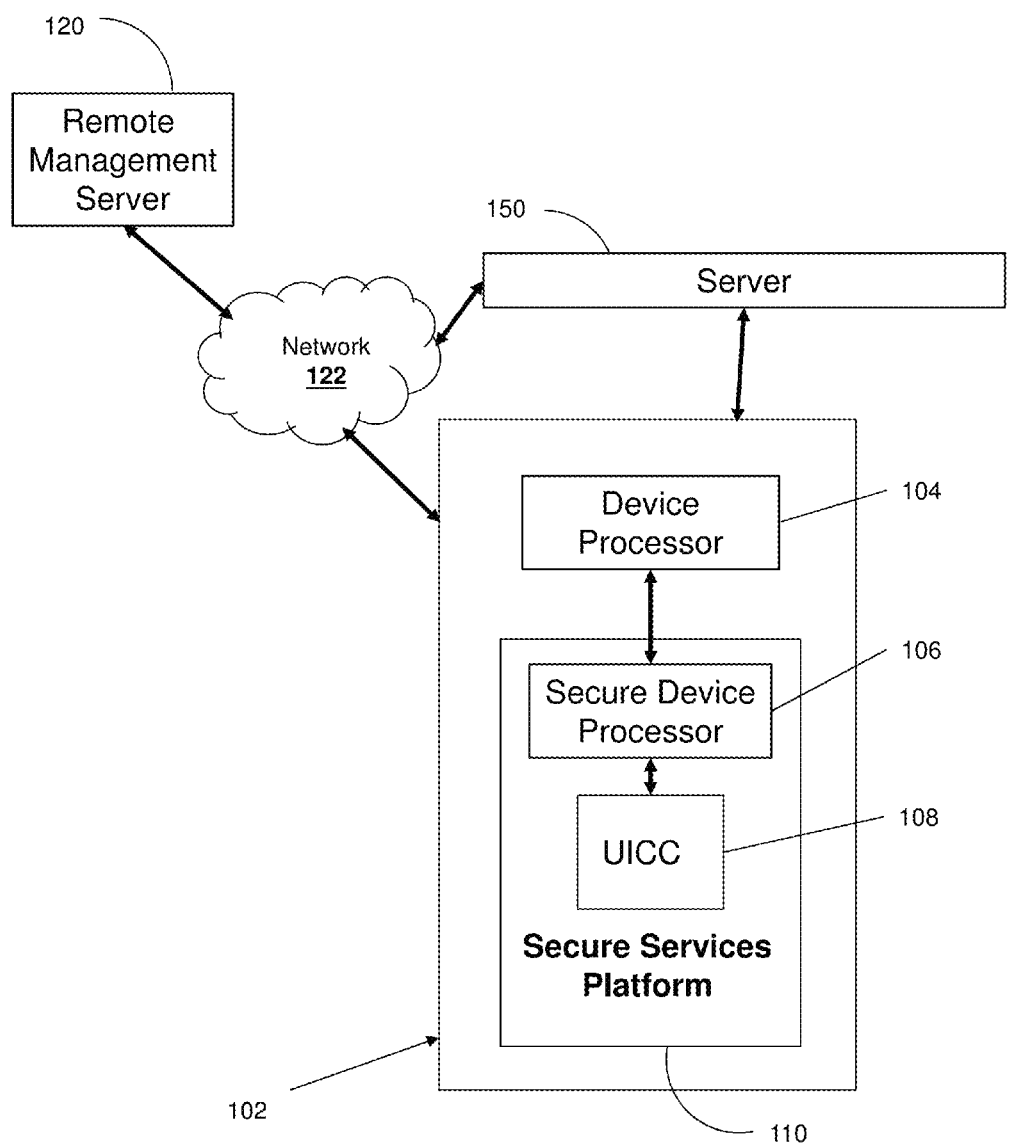
FIG. 1 depicts an illustrative embodiment of a system that enables use of a UICC in managing security domains.

The subject disclosure describes, among other things, illustrative embodiments of structure(s) and/or technique(s) for implementing or otherwise interacting with a security domain structure within a Universal Integrated Circuit Card (UICC), including creation and management of security domains. In one or more embodiments, the exemplary embodiments provide a security domain structure of a UICC that can be implemented based on Global Platform (GP) standards. In one or more embodiments, methods for creating operator specific security domain structures for both the UICC and eUICC are described. One or more of the exemplary embodiments can be implemented by various entities including groups and individuals responsible for developing and managing standards, the UICC/eUICC, the remote provisioning infrastructure, and/or the SIM-based services.

One embodiment of the subject disclosure is a device that includes a universal integrated circuit card, a processor, and a memory that stores executable instructions that, when executed by the processor, facilitate performance of operations. The device can, responsive to an over-the-air message, generate a security domain root structure for a universal integrated circuit card of the end user device. The security domain root structure can include a hierarchy of a link provider operator security domain above a mobile network operator trusted security domain, where the link provider operator security domain enables transport management by a link provider operator, and where the mobile network operator trusted security domain enables card content management and subscription eligibility verification by a mobile network operator trusted service manager. In one or more embodiments, the device is limited to a single mobile network operator trusted security domain.

One embodiment of the subject disclosure is a computer-readable storage device comprising executable instructions that, when executed by a processor of an end user device, facilitate performance of operations, that include generating a security domain root structure for a universal integrated circuit card of the end user device, where the security domain root structure includes a hierarchy of a link provider operator security domain above a mobile network operator trusted security domain, where the link provider operator security domain enables transport management by a link provider operator, and where the mobile network operator trusted security domain enables card content management and subscription eligibility verification by a mobile network operator trusted service manager. The operations can include adjusting the security domain root structure to include a service provider trusted security domain in the hierarchy below the link provider operator security domain, where the service provider trusted security domain enables a third party trusted service manager to perform card content management actions to applications and security domains that subtend it without obtaining authorization from the mobile network operator trusted service manager.

One embodiment of the subject disclosure is a method that includes determining, by a system including a processor, to operate a universal integrated circuit card of an end user device in a delegated mode, where the system is operated by a mobile network operator trusted service manager, and where the universal integrated circuit card has a security domain root structure with a hierarchy including a mobile network operator trusted security domain. The method can include, responsive to the determining to operate in the delegated mode, causing, by the system, the security domain root structure of the universal integrated circuit card to add a service provider trusted security domain in the hierarchy below the mobile network operator trusted security domain. The method can include receiving, by the system, a request from a third party trusted service manager to perform a card content management action. The method can include enabling, by the system via the mobile network operator trusted security domain, the third party trusted service manager to perform the card content management action to applications and security domains that subtend it via the service provider trusted security domain.

In one or more embodiments, the UICC (or secure element), the secure device processor and/or a device processor can be separate but in communication with each other. The UICC can be a highly secure computing platform for storing secrets such as encryption keys and authentication credentials, and can host and execute applets. The secure device processor can be a processor that is logically and/or physically separate from the device processor (and/or the secure element), and can offer more security than the device processor, but not as much security as the secure element. Examples of a secure device processor can include a Trusted Execution Environment (TEE) and an embedded Secure Element (eSE). Other embodiments are included in the subject disclosure.

One or more of the exemplary embodiments can utilize techniques and/or components, in whole or in part, described in U.S. application Ser. No. 14/091,679 filed on Nov. 27, 2013, the disclosure of which is hereby incorporated by reference in its entirety.

In accordance with an embodiment of the disclosure, FIG. 1 depicts a system 100 that includes a communication device 102 connected to or otherwise in communication with a network 122 and provided with a secure services platform 110 having a UICC 108 enabling secure communications via a security domain configuration that can be divided into card management, Global Platform services management and telephony management. The UICC 108 can operate in various modes that dictate or otherwise define how other systems (e.g., server 150), such as Link Provider Operator (LPO), Mobile Network Operator (MNO) and/or third party Service Provider (SP) Trusted Services Manager (TSM), communicate with the communication device 102. In one embodiment, a third party is an entity that is unrelated to the other providers or, if related, is operated independently of one or more of the other providers.

In one or more embodiments, system 100 enables the UICC to operate in various modes of operation including a simple mode (e.g., service providers can connect directly to an MNO TSM which is responsible for eligibility checking, content management, and/or service personalization); a delegated mode (e.g., supporting one or more NFC (Near Field Communication) services from service providers that do not have their own SP TSM and/or supporting one or more NFC services from service providers that are providing their own SP TSM but want to use the MNO's LPO platform for Over-The-Air messaging (OTA)); and authorized management/dual mode (e.g., supporting one or more NFC services from service providers that do not have their own SP TSM, supporting one or more NFC services from a service provider that is providing its own SP TSM but wants to use the MNO's LPO platform for OTA, and/or supporting one or more NFC services from a service provider that is providing its own SP TSM and OTA platform). In one or more embodiments, an Application Provided Security Domain (APSD) (or service provider security domain) can be utilized. In some instances, the APSD can be connected directly to TSDs. In other examples, the APSD can connect to a TSD (e.g., an MNO and/or SP) or directly to an LPO, such as when the MNO TSD is not in the hierarchy (authorized management) and there is no SP TSD. In one or more embodiments, the LPO and the TSD can be combined. In various embodiments described herein the APSD can be the SP SD.

It will be appreciated that the communication device 102 may be any device, including a user device. Device 102 is described as including a UICC and a secure device processor, but other embodiments can combine these components into a single processing unit. The term "user," in this example, refers to a human user of the communication device. However, in other embodiments, the user can be a machine that exchanges data with the communication device 102 after being authenticated to the communication device. In other embodiments, the UICC can be utilized without an SDP.

Communication device 102 can include a device processor 104, the SDP 106 and the secure element 108 (e.g., which can include or otherwise be the UICC). As an example, the UICC 108 can be various types of smart cards including a Subscriber Identification Module (SIM) card or other types of secure elements. The UICC 108 can be a secure computing platform and can offer a high level of security for storing encryption keys, authentication credentials, and the like. The UICC 108 may be removable from the device. In other embodiments, the UICC 108 may be embedded in the device and not removable. In other embodiments, the UICC 108 can be placed on a memory card or an embedded chip.

In one or more embodiments, the SDP 106 can be logically and/or physically separate from the device processor 104, and can be connected to both the device processor and the UICC 108. In this embodiment, the SDP 106 can offer a higher level of security than the device processor 104, and can store and execute secure applications. The SDP 106 can, for example, run applications in a trusted execution environment. The UICC 108 and SDP 106 together can form a secure services platform 110 resident on the device 102. In this embodiment, the UICC 108, the SDP 106 and the device processor 104 can each have a security level associated therewith, and the security level associated with the SDP 106 can be intermediate between that of the UICC 108 and that of the device processor 104. The SDP 106 and UICC 108 can use mutual authentication, as described in more detail below.

The UICC 108 and the SDP 106 can communicate with a remote management (function) server 120, located remotely from device 102. The Remote Management Server (RMS) 120 can be a platform for provisioning and/or managing applications in the UICC 108 and the SDP 106. The RMS 120 can also manage data (such as keys, credentials, and so forth) that are used by the applications. Examples of remote management servers are described in U.S. patent application Ser. No. 13/679,479 filed on Nov. 16, 2012 and U.S. patent application Ser. No. 13/680,680 filed on Nov. 19, 2012, the disclosures of both of which are hereby incorporated by reference. In one or more embodiment, the RMS, which can include a TSM, may also manage the security domains which themselves can be applications.

In this embodiment, communication device 102 can be a wireless communication device connected to a cellular network 122. Network 122 can also be other types of networks operating according to various communication protocols, such as a WiFi network. In other embodiments, device 102 can be connected to other devices via a wired connection through a computer. In still other embodiments, user devices can communicate with each other using Bluetooth®, infrared communications (IRDa) and/or NFC. A communication session between user devices, wherein information is transferred between the users, can be effected by a wide variety of arrangements. A secure application server (SAS) can be used in some embodiments to establish a secure communication session between devices. However, in some embodiments a secure application server may not be used where the communication session is established in a peer-to-peer manner, such as in Bluetooth®, IRDa or NFC.

Figure 2:
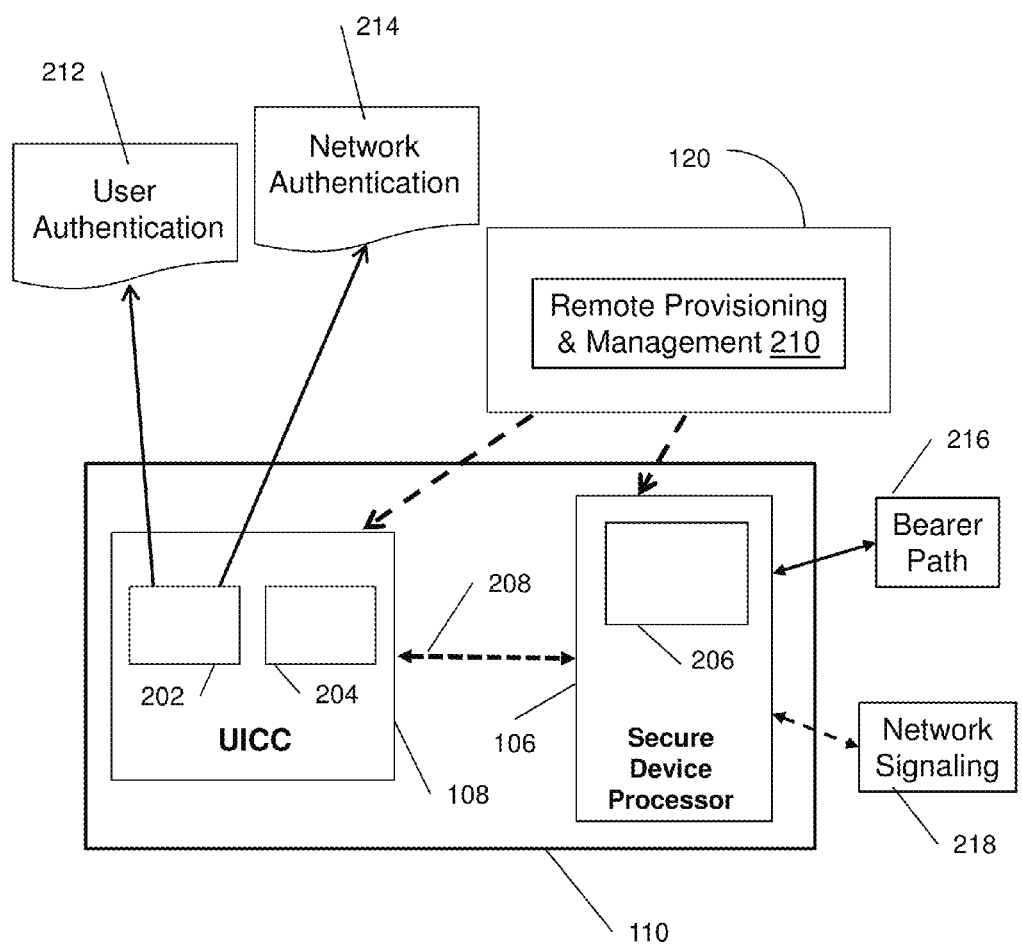
FIG. 2 depicts an illustrative embodiment of a system including the communication device of FIG. 1 implementing authentication and management functions, as well as provisioning functions and encryption functions.

FIG. 2 is a schematic illustration 200 showing details of a secure services platform 110, according to an embodiment of the disclosure, which can be used with the communication device 102 of FIG. 1. The UICC 108 can contain an authentication management function 202 and an encryption key generator 204. The authentication management function 202 can provide authentication services for the device. For example, the authentication management function 202 can support mutual authentication of components of the device 102 or mutual authentication between different devices. As shown in FIG. 2, the authentication management function 202 can include a user authentication service 212 for authenticating the user to the device and a network authentication service 214 for authenticating the device to network equipment. The encryption key generator 204 can supply encryption keys (e.g., a temporary encryption key) to an encryption engine 206 which is located in the SDP 106. In one embodiment, the key generation and/or the encryption can be performed in real-time. In one embodiment, the encryption engine 206 can encrypt and decrypt user information transmitted to or from a bearer path 216 that terminates at another device (e.g., another user device), and/or may encrypt and decrypt information transmitted on a signaling path 218 to the network. In another embodiment, the encryption engine can be loaded on a second UICC, separate from the UICC 108.

The RMS 120 can perform a remote provisioning and management function 210 to load applications, content and/or other information (e.g., various keysets) into the UICC 108 and/or SDP 106. In this embodiment, the RMS 120 can provision the authentication management function 202 and encryption key generator 204 on the UICC 108, and can provision the encryption engine 206 on the SDP 106. This can be done securely by the use of one or more remote management keysets. In one embodiment, before the secure services platform 110 can be used for communication, the SDP 106 can be authenticated by the UICC 108. In one embodiment, this can be done using a UICC-SDP keyset. The UICC-SDP keyset may be provisioned remotely by the RMS 120 or locally by an authorized user. In this embodiment, after the UICC 108 and SDP 106 are mutually authenticated using the UICC-SDP keyset, they can communicate via a signaling path 208 within the secure services platform 110. The UICC-SDP keyset may be used for secure communication during initial loading and provisioning. However, the keys being utilized may be different. In one embodiment, the path between the UICC 108 and the SDP 106 can go through the device processor 104 rather than directly between the UICC and the SDP.

Figure 3:
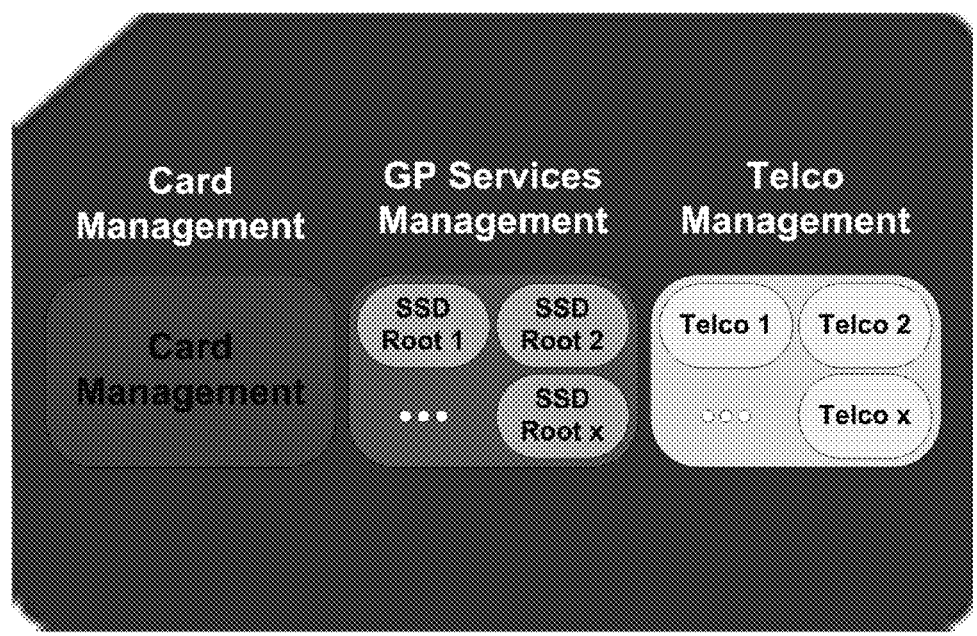
FIGS. 3-12 depict illustrative embodiments of security domain configurations for a UICC that can be separated into card management, Global Platform services management and telephony management.

Referring to FIG. 3, another exemplary UICC 300 of an end user device (e.g., a mobile phone) is illustrated in which the UICC is divided into three groups of security domains: card management, GP services management, and telephony management. The UICC 300 allows for telephony management to be placed in a security domain separate from an Issuer Security Domain (ISD). ISD keys can require a very high level of security that may not be necessary for the management of profiles, such as telephony profiles. In the exemplary embodiments, the profiles may be referred to as telephony profiles. These profiles may be limited to telephony information or they may also include other information (in place of or in addition to telephony information) related to other services including video, messaging and/or data). Placing telephony management functions (or one or more other functions such as of a mobile network operator) in a separate security domain allows operation with a lower set of security requirements than the ISD. The UICC 300 provides an LPO Security Domain (SD) that is separate from the MNO (Trusted Security Domain) TSD so as to remove secure channel management associated with transport (e.g., SCP80/81) from the MNO TSM. This allows the MNO TSM to manage applications directly using its own application key (e.g., SCP02/03) while making use of secure transport from the LPO and it allows an SP TSM to operate with Authorized Management (AM) while using the same LPO as the MNO TSM.

The card management domain of the UICC 300 can include the ISD and can optionally include a Controlling Authority Security Domain (CASD) and/or a Verification Authority Security Domain (VASD). For example, the CASD can be utilized for confidential card content management (CCCM), while the VASD is utilized for mandated Dedicated Access Privilege (DAP). In one embodiment, the GP services management domain includes all of the Supplemental Security Domains (SSDs) and applications related to GP-based services. In one embodiment, the telephony management domain includes the telephony profile for the UICC 300. In one or more embodiments, a "SIM-based" service can operate without a TSM. For example, an application can operate via the authorized management mode.

The UICC 300 can be utilized in various ways for "SIM-based" services, including mobile wallet, transportation, building access, ID management, and more. Each of these services utilize some type of network management infrastructure, such as an Over-the-Air (OTA) platform, one or more Trusted Service Managers (TSMs) and corresponding management functions in the form of security domains within the UICC and eUICC. As the number of services proliferate, the network management infrastructure and corresponding UICC/eUICC security domain structure will grow, which is accounted for in the exemplary embodiments.

In one or more embodiments of the UICC 300 (and its respective end user device), applications can be loaded and managed remotely via an OTA process utilizing a mechanism to support various use cases while maintaining an ability to fully manage the UICC in situ. The UICC 300 can support multiple service providers, TSMs, and OTA platforms; support various modes of operation (e.g., simple mode, delegated mode, and dual mode); support full remote management; minimize mass reconfigurations; minimize or otherwise reduce the need or desire for a UICC swap; and/or minimize or otherwise reduce the total number of security domain configurations.

The UICC 300 can utilize a modular approach to management of security domains within the UICC. The UICC 300 enables multiple security domains supporting multiple modes of operation to be created and managed remotely; while also creating and managing security domains for very simple use case scenarios.

In one embodiment, the card management domain contains card management functions specified by GP such as the ISD, CASD, and VASD where there is only one card management domain per UICC. In this embodiment, there is only one ISD in the card management domain. The CASD and VASD can be optional depending on implementation. In one embodiment, the ISD can be accessed using the ISD's SCP80 and/or SCP81 transport keysets.

Figure 4:
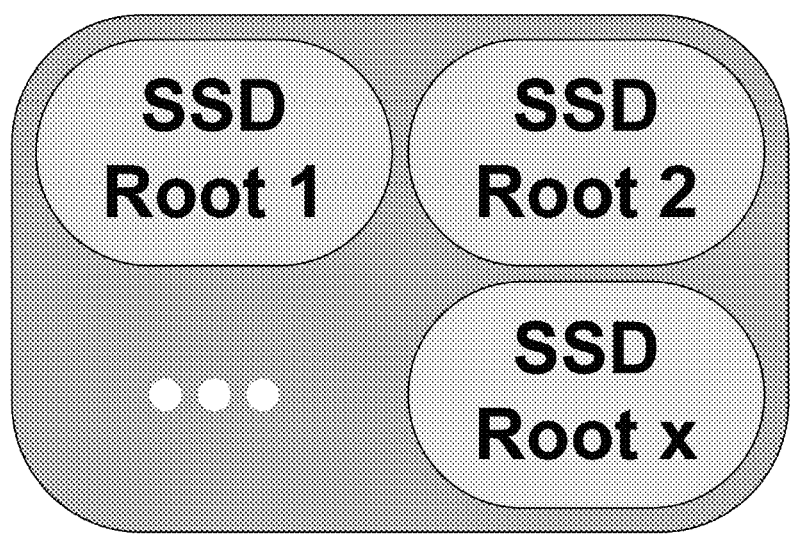

Referring to FIG. 4, the GP services management domain 400 is illustrated. In one embodiment, the GP services management domain 400 can include all supplemental security domains and applications related to services whose management is governed by GP. The GP services management domain 400 can include one or more hierarchies of supplemental security domains called SSD root structures. As an example, each SSD root can include one or more security domains operating in various modes of operation and/or third party OTA platforms.

Figure 5:
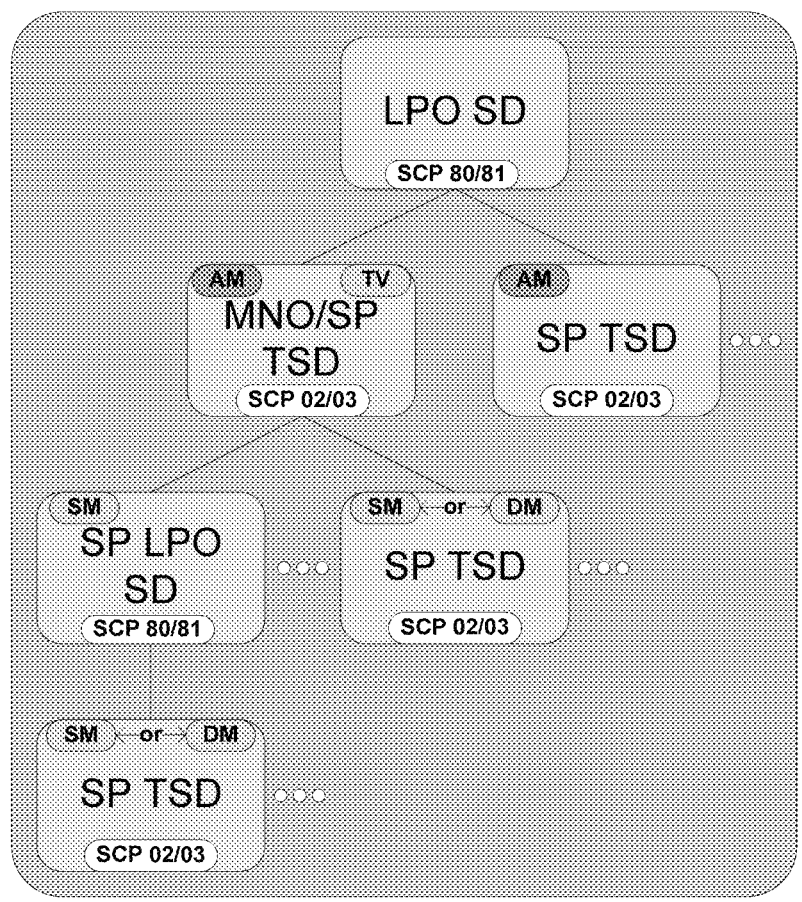

Referring to FIG. 5, a GP services management domain 500 is illustrated that has been populated or otherwise adjusted to include within each SSD root structure (only one is shown) an Link Provider Operator Security Domain (LPO SD) which corresponds to an OTA platform used to transport management messages over the air. The Link Provider Operator can use transport keys for secure communications with the UICC such as SCP80 and/or SCP81 transport keysets. In one or more embodiments, there can be more than one LPO SD in an SSD root structure. In this example, only one can be at the top of the hierarchy.

In the first SSD root structure, immediately below the LPO SD is a Mobile Network Operator Trusted Secure Domain (MNO TSD) with the Authorized Management (AM) privilege that is associated with an MNO TSM. The MNO TSM can perform device and mobile subscription eligibility verification, as well as card content management using various keysets for secure communications, such as SCP02 or SCP03 keysets. The MNO TSM can support service providers and Service Provider Trusted Services Managers (SP TSMs) operating in Simple and Delegated modes (SM and DM, respectively), and in some embodiments it can manage applications. In one or more embodiments, the MNO TSM can cause the generation of SP Trusted Security Domains (TSDs) (and SP SDs which are not shown) below the MNO TSD for the SP TSMs it manages and can assign them with an SCP keyset (e.g., personalization) and a set of privileges. The SCP keys can be rotated through the services of the CASD to ensure that only the SP TSM and its corresponding TSD have the actual keys that will be used between them. In one or more embodiments, the MNO TSM does not manage the SP TSMs but rather manages the actions (e.g., content card management) that the SP TSMs perform while managing their subtending applications. In one or more embodiments, the MNO TSM does not manage the APSDs and/or the SP SDs but rather manages the actions (e.g., content card management) that the APSDs and/or the SP SDs perform while managing their subtending applications.

When supporting service providers and SP TSMs operating in Simple Mode, the MNO TSM can perform content card management actions such as application loading and service personalization on behalf of the service providers. In addition, the MNO TSM can cause SP TSDs to be generated in the UICC 300 under it for all SP TSMs that it supports. When supporting SP TSMs operating in Delegated Mode (DM), the MNO TSM can cause an SP TSD to be generated in the SSD root structure below the MNO TSD, can assign it with the Delegated Management privilege, and can use token verification and receipt generation to authorize the SP TSM to perform various card content management actions. In one embodiment, key rotation can be utilized such as described above for the SP TSD operating in Simple Mode. In one or more embodiments, service provider SDs (which are not using an SP TSD) can also operate with the DM. As described above, ASPDs can be used interchangeably with SP SDs.

In one embodiment, if the SP TSM operating in Delegated Mode wishes to use the LPO corresponding to the LPO SD, the MNO TSM can grant the SP TSD a Trusted Path privilege. The Trusted Path privilege allows commands from the SP TSM to be passed from the SP TSD to the LPO SD, bypassing the MNO TSD. If the SP TSM intends to use its own OTA platform, an SP LPO SD can be created by the MNO TSM in the SSD root structure between the MNO TSD and the SP TSD and can be provided with SCP80 and/or SCP81 keysets. These SCP80 and/or SCP81 keysets may then be rotated using the services of the CASD. In one embodiment, token verification and receipt generation can make use of the Trusted Path privilege to operate between the SP TSD and the MNO TSD. In one or more embodiments, service provider SDs can operate with DM (e.g., SPs which do not use an SP TSM).

In one embodiment, SP TSDs, which use the LPO corresponding to the LPO SD for transport but operate with the Authorized Management privilege, can be created by the ISD and located below the LPO SD in the SSD root structure hierarchy. These SP TSDs can operate independently of the MNO TSM and can have their own SCP02 and/or SCP03 keysets which may be rotated after creation using the services of the CASD. In one or more embodiments, service provider SDs (which do not use an SP TSD) can also operate with AM.

In one embodiment, SP TSDs, which operate with Authorized Management and utilize their own OTA platform, can be located in a separate SSD root structure that does not contain an MNO TSD. This second or more SSD root structure can be created by the ISD and can be comprised of an SP LPO SD with SCP80 and/or SCP81 keysets and an SP TSD with SCP02 and/or SCP03 keysets. These keysets may be rotated using the services of the CASD. As described above, the GP Services domain can support multiple applications, LPOs, and/or SP TSDs operating in simple, delegated, and/or dual modes. These examples can also be utilized by service provider SDs operating with AM (e.g., SPs which do not use an SP TSM). One or more embodiments can also be SP SDs operating with SM, DM, and AM when the SPs are not using SP TSMs.

Figure 6:
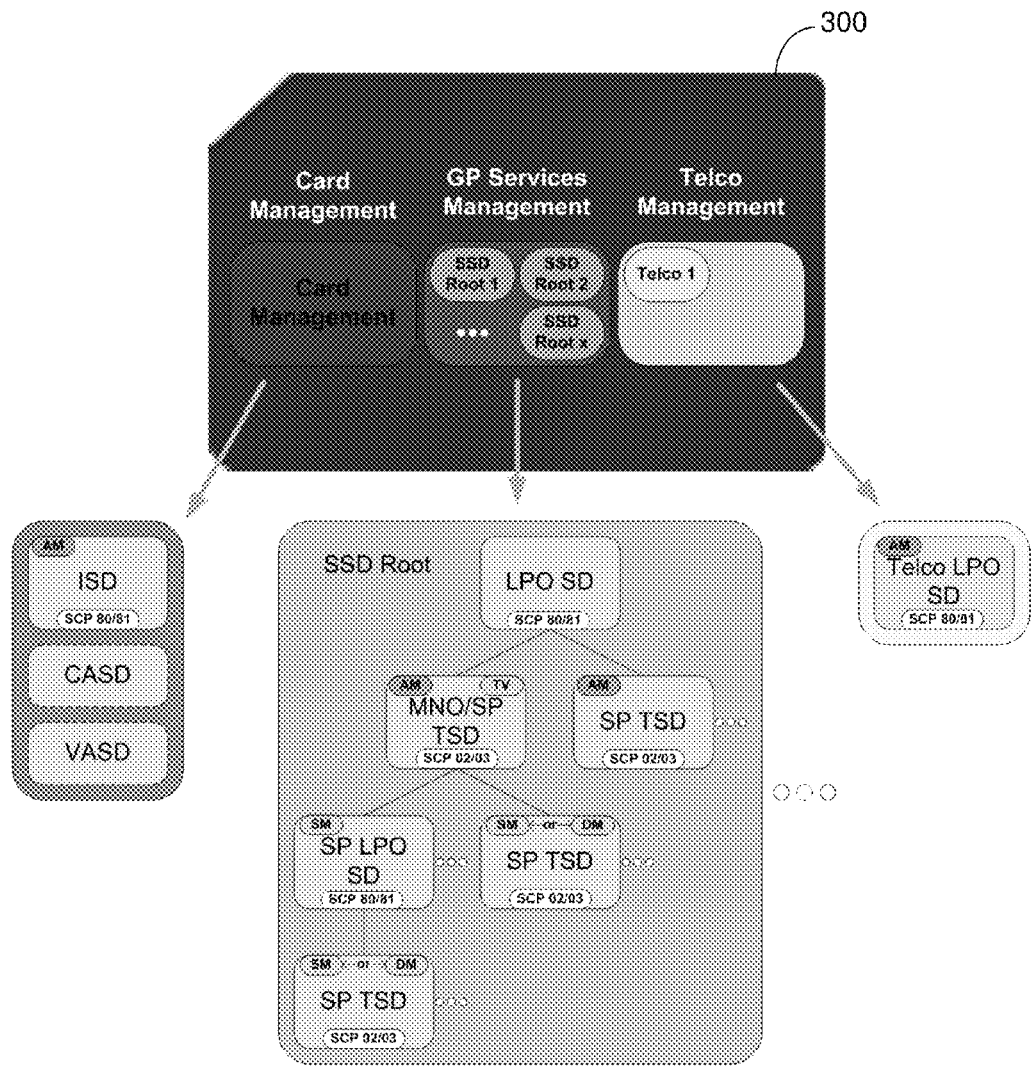

Referring to FIG. 6, UICC 300 is illustrated that includes a security domain 600 which includes the card management domain, the GP services management domain and the telephony management domain. The telephony management domain can contain Remote File Management (RFM) applications which are used to remotely manage legacy telecommunications operations, such as defined by 3GPP. In one embodiment, these applications can be accessed through an LPO SD with the Authorized Management privilege using an SCP80 and/or SCP81 keyset. In another embodiment, the telephony management domain can be placed under the ISD. The telephony management domain can be capable of supporting multiple operator profiles such as those defined in the GSMA embedded SIM remote provisioning architecture. In one embodiment, a UICC can have a single operator profile while an eUICC may have multiple profiles. The security domain 600 can include the CASD and/or VASD as optional. Within the GP services management domain, there may be one or more SSD root structures, and within each SSD root structure there may be multiple SP TSMs operating in Simple, Delegated, and/or Dual Mode. In one embodiment, there can be a single telephony profile and therefore a single telephony LPO SD. In one or more embodiments, the telephony profiles can be placed in or otherwise provisioned to the ISD such that the telephony management domain is combined with the card management domain.

Figure 7:
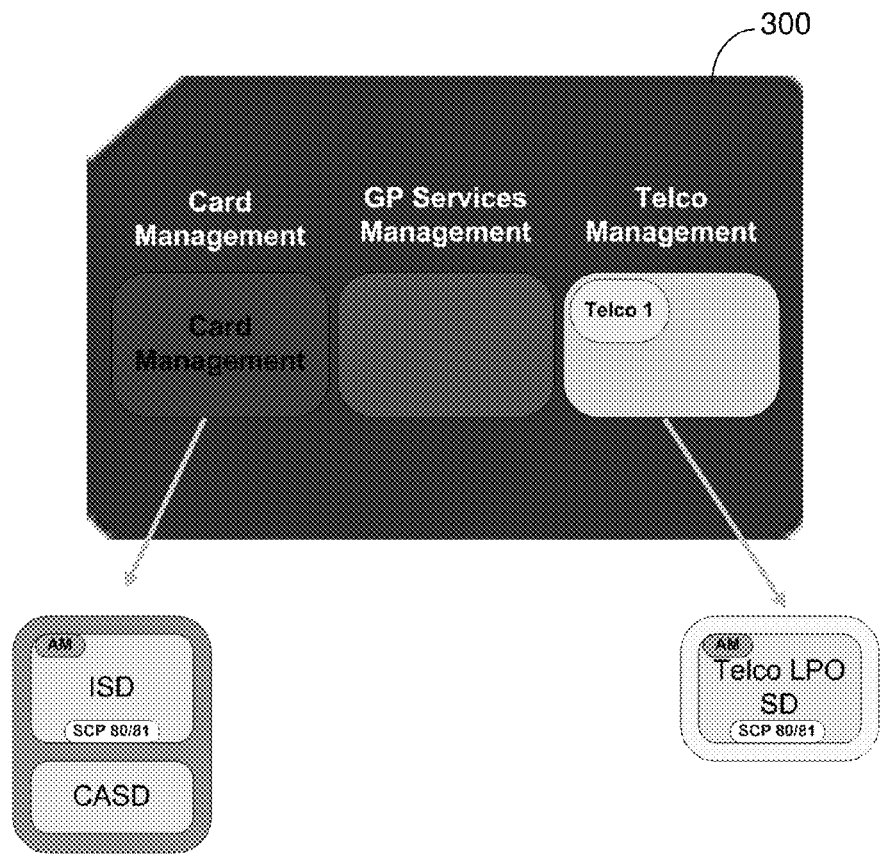

FIGS. 7-12 illustrate UICC expansion via security domain management. In FIG. 7, the UICC 300 is illustrated in a first phase 700 where there are not yet any Global Platform Services. For instance, phase 700 can be when the UICC 300 is first put into service. At this point, the UICC may have only the ISD, CASD, and telephony SD defined without yet having an SSD root structure. The ISD and telephony SD can each have their own set of SCP80 and/or SCP81 keysets. The UICC 300 would not yet be ready to support Global Platform services.

Figure 8:
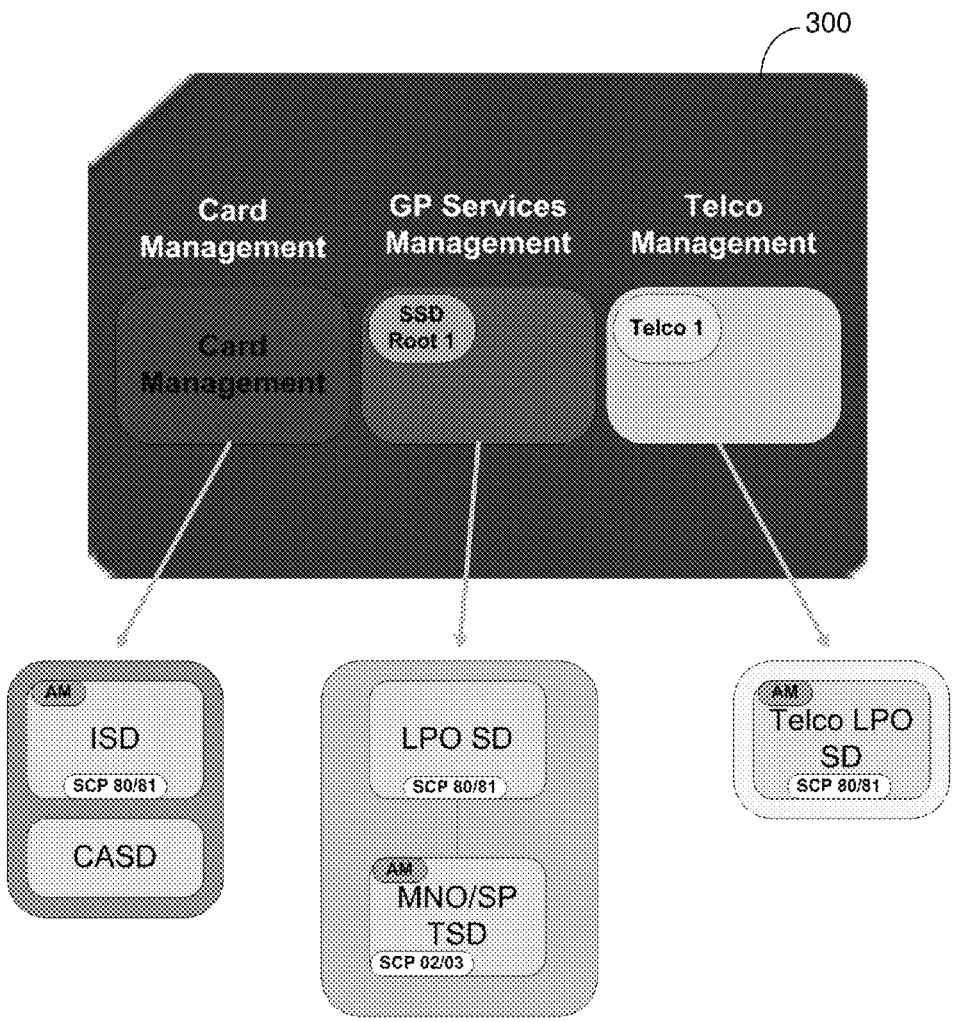

In FIG. 8, the UICC 300 is illustrated in a second phase 800 where there is a single MNO TSM supporting operation in a Simple Mode. For example, in order to enable the UICC 300 to support Global Platform services, an SSD root structure can be created over the air using the services of the ISD. Two security domains can be created in the UICC 300, one for the OTA and one for the MNO/SP TSD. In one embodiment, the LPO SD can be provided with a set of SCP80 and/or SCP81 keysets. The MNO/SP TSD can be provided with a set of SCP02 and/or SCP03 keysets and can be granted Authorized Management. In one embodiment, service providers can connect directly to the MNO TSM and can operate in Simple Mode. The MNO TSM can be responsible for eligibility checking, content management, and/or service personalization. An example of this configuration is a UICC that supports one or more NFC services from service providers who do not have their own SP TSM and who wish to operate in SM.

Figure 9:
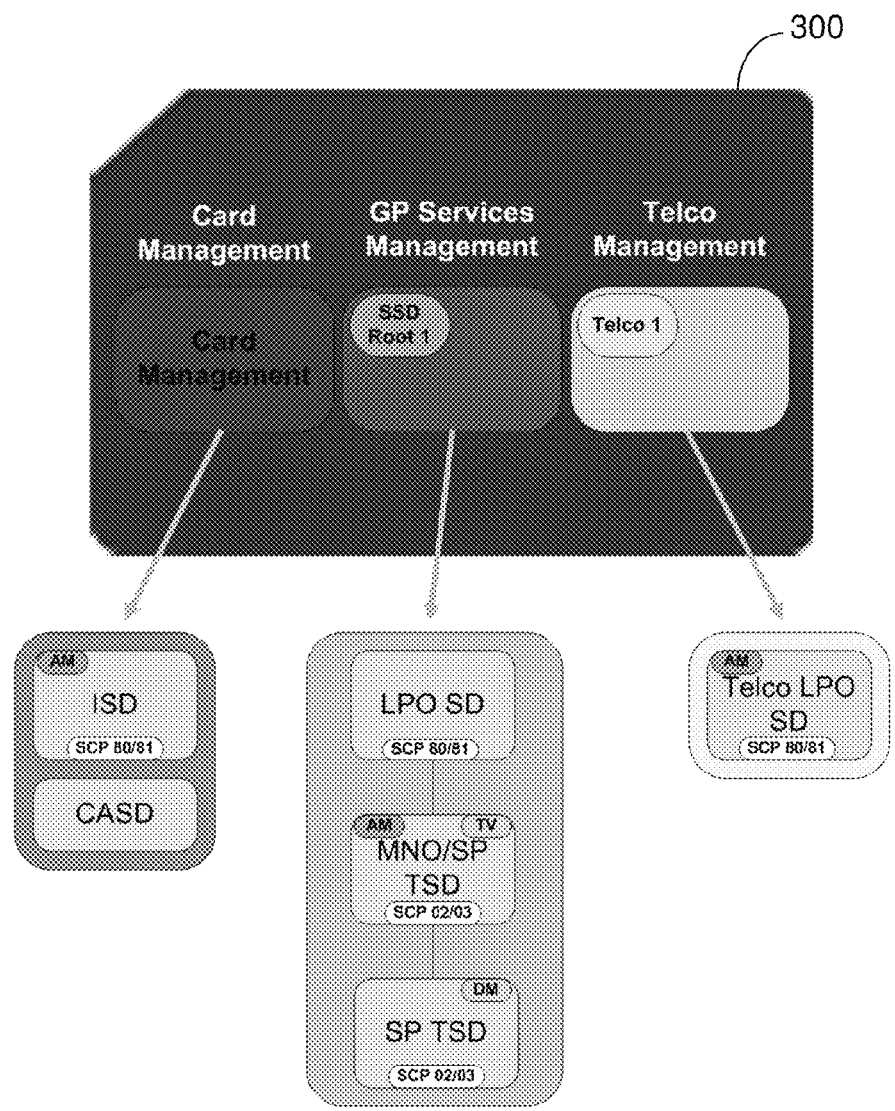

In FIG. 9, the UICC 300 is illustrated in a third phase 900 where there is a single MNO TSM supporting Simple and Delegated Modes. The previous use case of second phase 800 does not support third Party TSMs. One way to support third party TSMs is through Delegated Management. When operating in Delegated Mode, the third party SP TSM can ask permission or otherwise seek authorization from the MNO TSM when it wishes to perform card content management actions within its SP TSD and to applications below it. To support the third party SP TSM, the MNO TSM must create a new security domain for the $3^{rd}$ Party SP TSM and grant it the Delegated Management privilege. In one embodiment, the MNO TSM can have the token verification and receipt generation privileges. If it does not have these privileges, they can be granted by the ISD. In this example, the SP TSD does not have its own OTA platform and can use the services of the LPO. An example of this configuration is a UICC that supports one or more NFC services from service providers who do not have their own SP TSM, and/or supports one or more NFC services from service providers who are providing their own SP TSM but want to use the MNO's LPO platform for OTA. These examples can be applied to a single MNO TSM supporting SM as well as a single MNO TSM supporting SM and DM.

Figure 10:
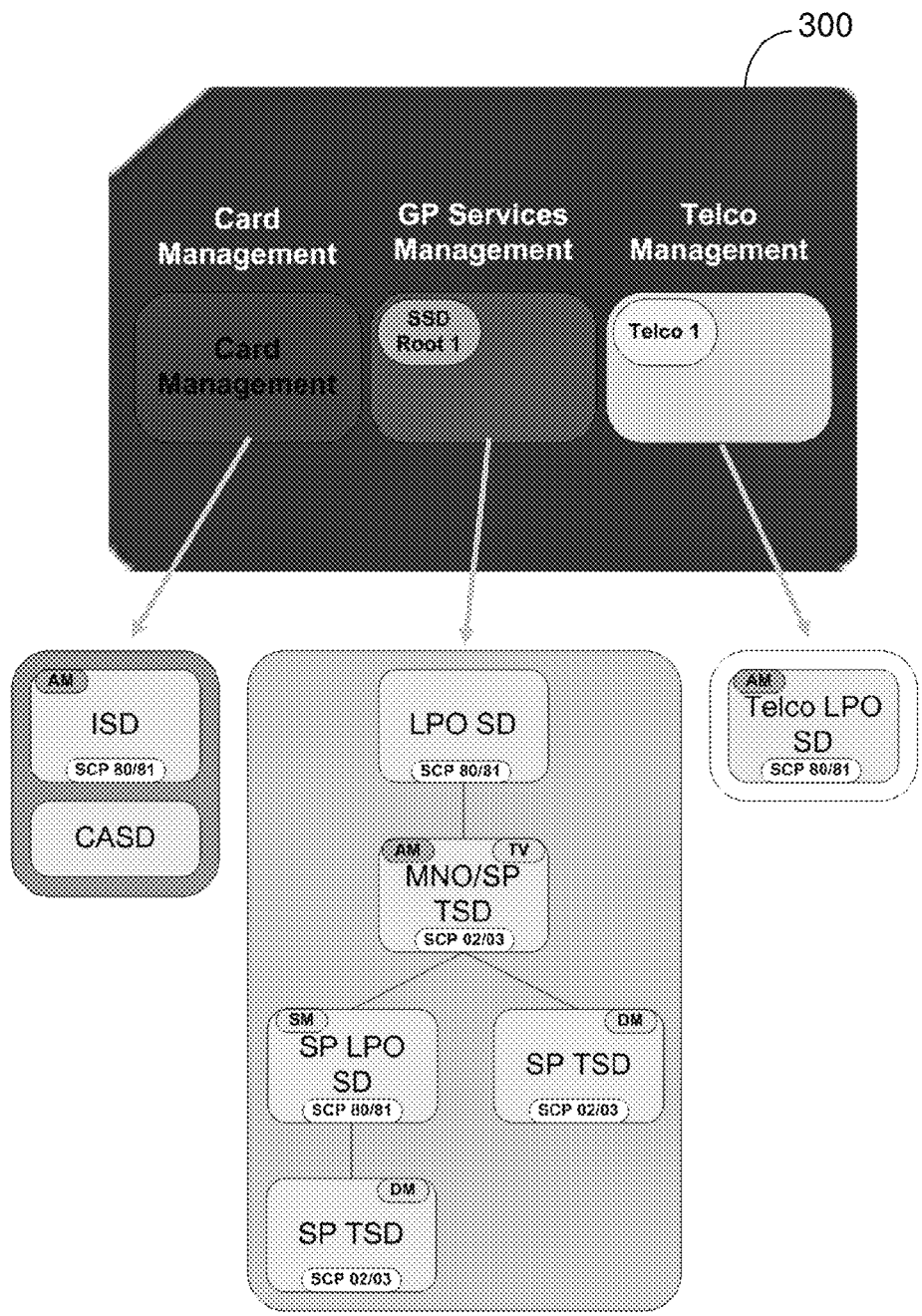

In FIG. 10, the UICC 300 is illustrated in a fourth phase 1000 where there is a single MNO TSM supporting Simple and Delegated Modes with support for third party OTA. For example, if an SP TSM intends or desires to use its own OTA platform while operating in Delegated Mode, then two security domains can be created in the SSD root structure hierarchy under the MNO TSD: one for the SP TSM OTA platform and one for the SP TSD. An example of this configuration is a UICC that supports one or more NFC services from service providers who do not have their own SP TSM; supports one or more NFC services from service providers who are providing their own SP TSM but want to use the MNO's LPO platform for OTA; and/or supports one or more NFC services from service providers who are providing their own SP TSM and OTA platform.

Figure 11:
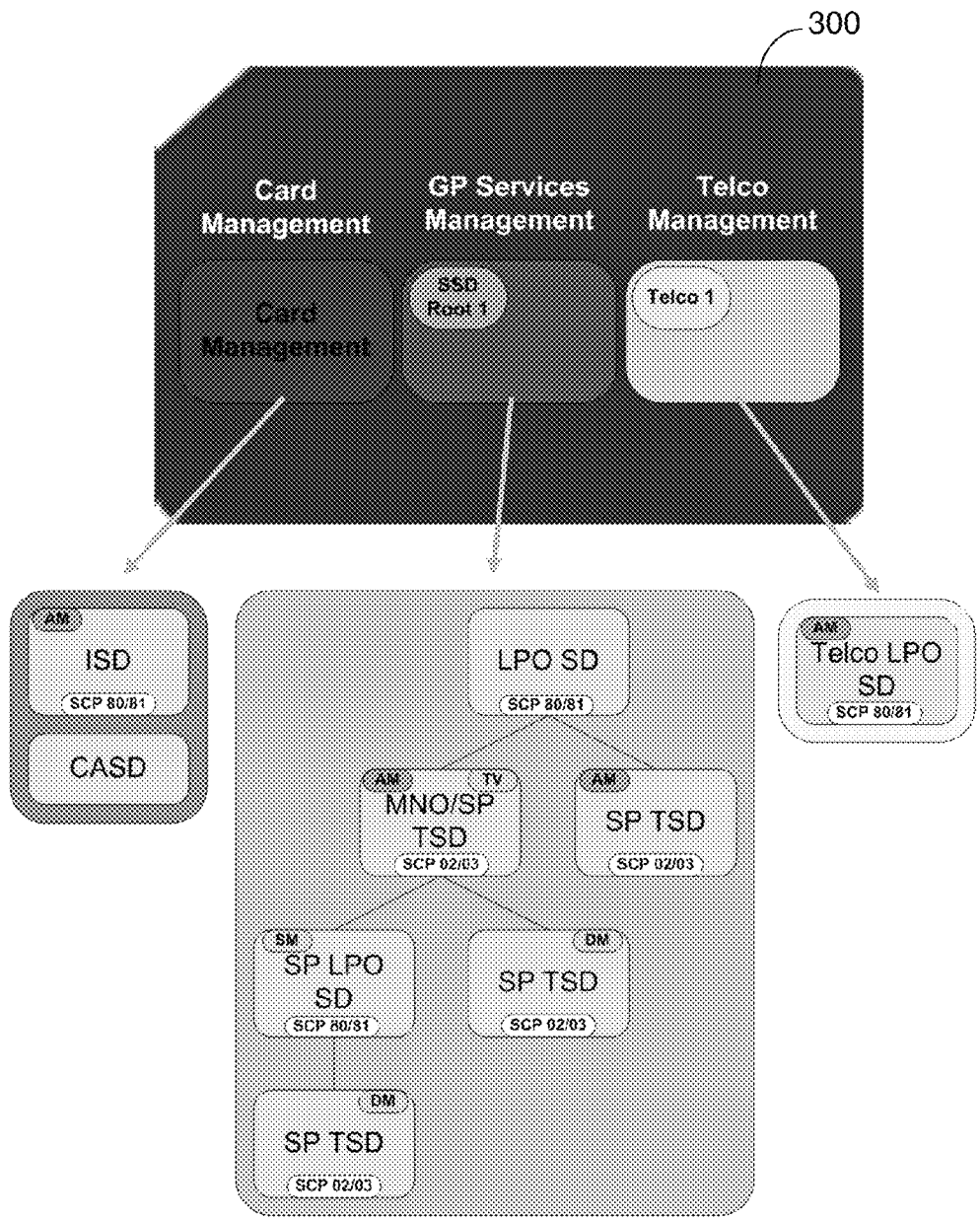

In FIG. 11, the UICC 300 is illustrated in a fifth phase 1100 where there is a single MNO TSM supporting Simple and Delegated Modes and supporting SP TSMs with Authorized Management. In this example, another mode of operation for a third party SP TSM is Authorized Management (Dual Mode). With Authorized Management, the SP TSM can manage applications under its SP TSD independently from and without obtaining authorization from the MNO TSM. To support the third party SP TSM, the ISD must create a new security domain for the third party SP TSM and grant it the Authorized Management privilege. Since the third party SP TSM intends to use the LPO, this security domain can be created under the existing LPO SD as shown in FIG. 11. The newly generated third party TSD can be provided with an initial set of SCP02 and/or SCP03 keysets from the ISD. Once the security domain is created, these keysets can be rotated via the CASD to ensure that the contents are not visible to either the MNO TSM or the LPO. An example of this configuration is a UICC that supports one or more NFC services from service providers who do not have their own SP TSM; supports one or more NFC services from a service provider who is providing its own SP TSM but wants to use the MNO's LPO platform for OTA; supports one or more NFC services from a service provider who is providing its own SP TSM and OTA platform; and/or supports one or more NFC services from a service provider who is providing its own SP TSM and wishes to operate with Authorized Management but wants to use the MNO's LPO platform for OTA.

Figure 12:
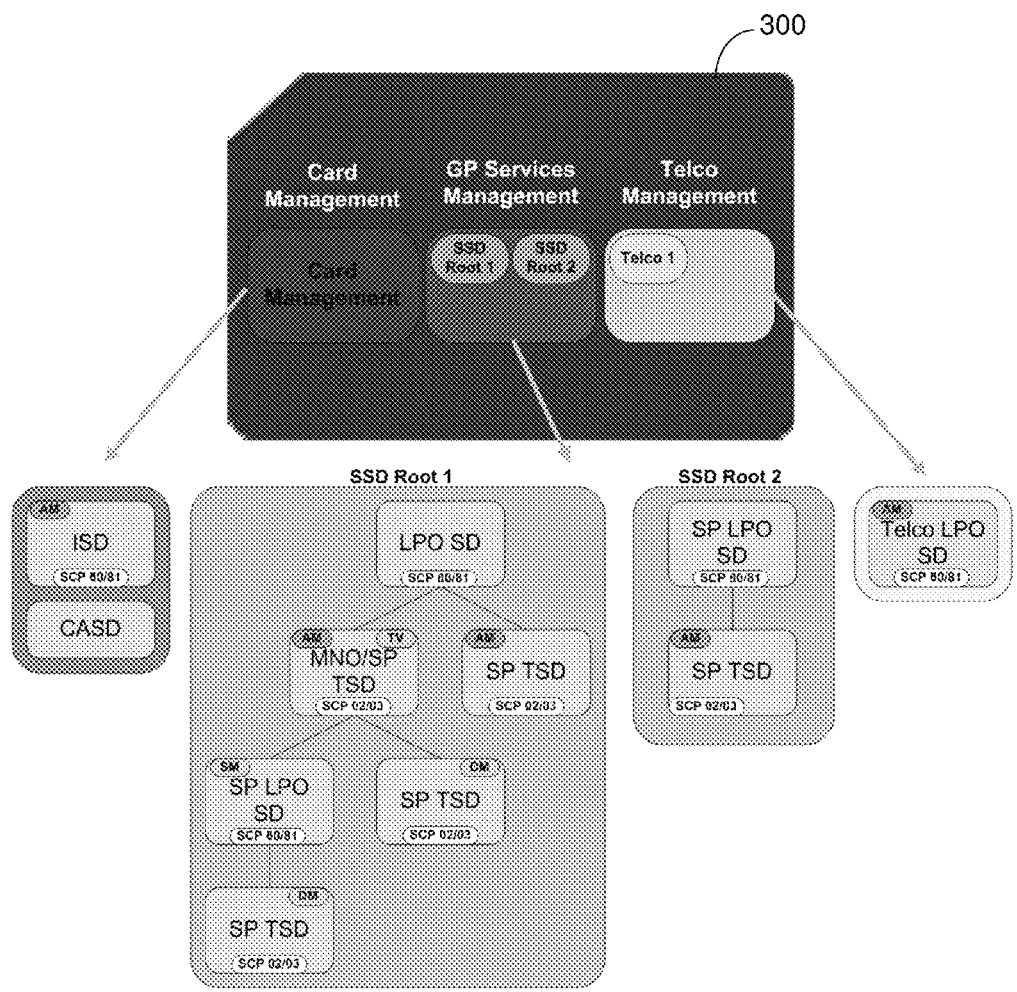

In FIG. 12, the UICC 300 is illustrated in a sixth phase 1200 where there is a single MNO TSM supporting Simple and Delegated Modes and supporting SP TSMs with Authorized Management and third party OTA. For example, if an SP TSM operating in Authorized Mode intends or desires to use its own OTA platform, then two security domains can be created by the ISD under a new SSD root structure (SSD Root 2 in FIG. 12): one for the SP TSM OTA platform and one for the SP TSM. In the new SSD root structure an SP LPO SD can be created with SCP80 and/or SCP81 keysets and the SP TSD can be created with SCP02 and/or SCP03 keysets. Once created, the keysets can be rotated using the CASD. The SP TSD in the new SSD root structure can be granted the Authorized Management privilege. An example of this configuration is a UICC that supports one or more NFC services from service providers who do not have their own SP TSM; supports one or more NFC services from a service provider who is providing its own SP TSM but wants to use the MNO's LPO platform for OTA; supports one or more NFC services from a service provider who is providing its own SP TSM and OTA platform; supports one or more NFC services from a service provider who is providing its own SP TSM and wishes to operate with Authorized Management but wants to use the MNO's LPO platform for OTA; and/or supports one or more NFC services from a service provider who is providing its own SP TSM, wishes to operate with Authorized Management, and is providing its own OTA.

Figure 13:
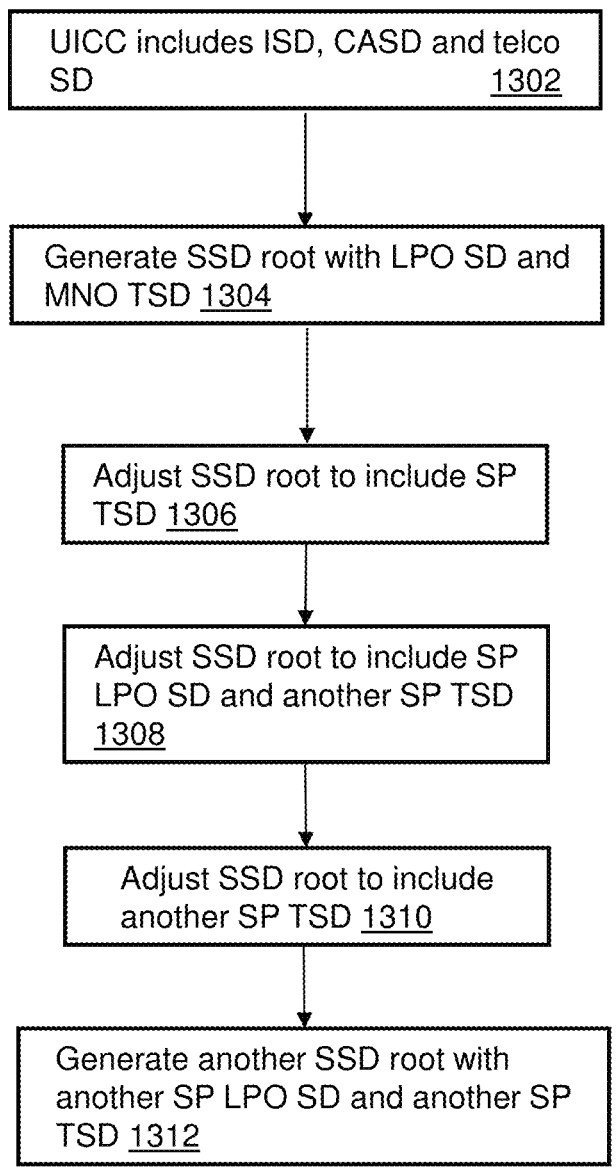
FIG. 13 depicts an illustrative embodiment of a method used in portions of the systems described in FIGS. 1-12.

FIG. 13 depicts an illustrative embodiment of a method for managing security domains in a UICC of an end user device. More or less than the steps described in method 1300 can be performed in one or more exemplary embodiments, and the order of steps can be rearranged.

Method 1300 can begin at 1302 where a UICC 300 includes an ISD, a CASD and a telephony SD. The UICC 300 can receive an over-the-air message and responsive to the over-the-air message at 1304 can generate a SSD root structure for the UICC. The SSD root structure can have a hierarchy with an LPO SD above an MNO TSD. In one embodiment, the LPO SD enables transport management by a link provider operator. In another embodiment, the MNO TSD enables card content management and/or subscription eligibility verification by an MNO TSM.

At 1306, responsive to a determination to operate in a delegated mode, the UICC 300 can adjust the SSD root structure to include a SP TSD in the hierarchy below the MNO TSD. In one embodiment, the SP TSD enables a third party trusted service manager to perform card content management actions subject to authorization from the MNO TSM. At 1308, responsive to a determination to allow the third party trusted service manager to utilize a third party over-the-air platform, the UICC 300 can adjust the SSD root structure to include an SP LPO SD in the hierarchy below the MNO TSD and to include another SP TSD in the hierarchy below the SP LPO SD. In one or more embodiments, the SP TSD can be added to the hierarchy when operating in SM as well as DM. For example, the UICC can adjust the SSD root structure to include a SP TSD below the MNO TSD after a determination to operate in a simple mode as well as a determination to operate in a delegated mode.

At 1310, responsive to a determination to operate in an authorized management/dual mode, the UICC 300 can adjust SSD root structure to include another SP STD in the hierarchy below the LPO SD, where the SP TSD enables a third party trusted service manager to perform card content management actions without obtaining authorization from the mobile network operator trusted service manager. At 1312, responsive to a determination to allow a third party trusted service manager to utilize a third party over-the-air platform, the UICC 300 can generate another SSD root structure that includes a second hierarchy of an SP LPO SD above another SP TSD.

Method 1300 allows for the UICC 300 to include the ISD, the CASD and the telephony SD when the SSD root structure is generated. In one embodiment, the LPO SD can utilize a first keyset for first secure transmissions, and the MNO TSD can utilize a second keyset for second secure transmissions. In another embodiment, the UICC 300 can include a CASD and an SP TSD, wherein the SP TSD utilizes a keyset to securely communicate with a third party trusted service manager, and where the keyset is generated by the CASD.

Figure 14:
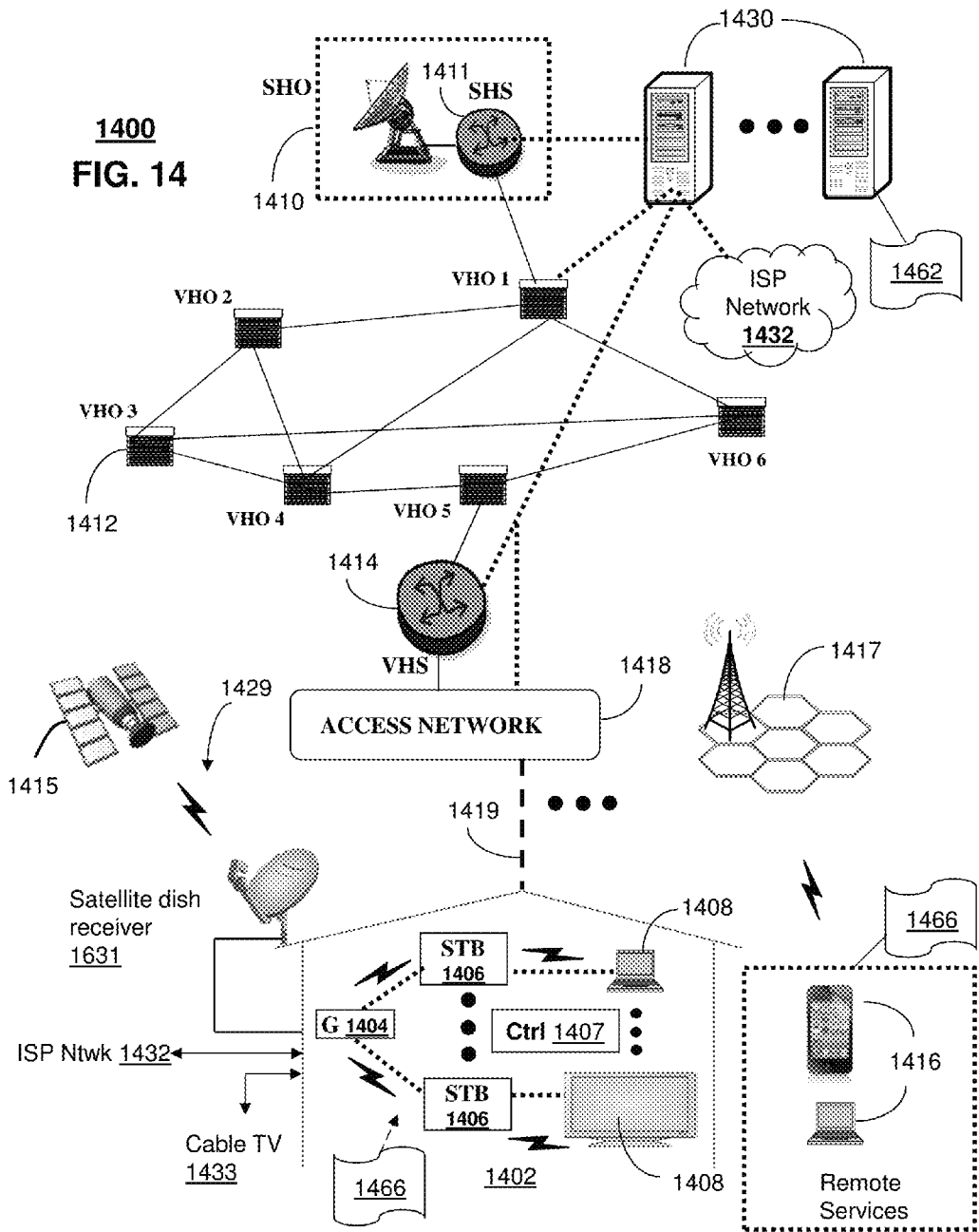
FIG. 14 depicts an illustrative embodiment of a communication system that provides media services and secure communications through use of a UICC that includes a security domain configuration.

FIG. 14 depicts an illustrative embodiment of a communication system 1400 for delivering media content and allowing end user communication. The communication system 1400 can represent an Internet Protocol Television (IPTV) media system. Communication system 1400 can be overlaid or operably coupled with systems 100, 200 of FIGS. 1 and 2 as another representative embodiment of communication system 1400. In one or more embodiments, system 1400 enables a UICC to manage security domains to facilitate communications including "SIM-based" services, such as mobile wallet, transportation, building access, ID management, and more.

System 1400 allows for a determination to operate the UICC of an end user device in a delegated mode where the system is operated by an MNO TSM and where the UICC has a SSD root structure with a hierarchy including an MNO TSD; responsive to determining to operate in the delegated mode, causing the SSD root structure of the UICC to add an SP TSD in the hierarchy below the MNO TSD; receiving a request from a third party trusted service manager to perform a card content management action; and/or enabling via the MNO TSD, the third party trusted service manager to perform the card content management action via the SP TSD. System 1400 also enables the SSD root structure to include an LPO SD in the hierarchy above the MNO TSD, wherein the LPO SD enables transport management by an LPO, and where the MNO TSD enables card content management and/or subscription eligibility verification by the MNO TSM. In one embodiment, the LPO SD can utilize a first keyset for first secure transmissions, and the MNO TSD can utilize a second keyset for second secure transmissions. In another embodiment, the UICC can include a CASD, where the SP TSD can utilize a keyset to securely communicate with the third party trusted service manager, and where the keyset is generated by the CASD. In another embodiment, the UICC includes an ISD, a CASD, and a telephony security domain when the SSD root structure is generated. In one or more embodiments, a determination by a system to operate in a delegated mode may not be the only cause for an SP TSD to be created under the MNO TSD. An SP TSD may operate in SM.

The IPTV media system can include a super head-end office (SHO) 1410 with at least one super headend office server (SHS) 1411 which receives media content from satellite and/or terrestrial communication systems. In the present context, media content can represent, for example, audio content, moving image content such as 2D or 3D videos, video games, virtual reality content, still image content, and combinations thereof. The SHS server 1411 can forward packets associated with the media content to one or more video head-end servers (VHS) 1414 via a network of video head-end offices (VHO) 1412 according to a multicast communication protocol.

The VHS 1414 can distribute multimedia broadcast content via an access network 1418 to commercial and/or residential buildings 1402 housing a gateway 1404 (such as a residential or commercial gateway). The access network 1418 can represent a group of digital subscriber line access multiplexers (DSLAMs) located in a central office or a service area interface that provide broadband services over fiber optical links or copper twisted pairs 1419 to buildings 1402. The gateway 1404 can use communication technology to distribute broadcast signals to media processors 1406 such as Set-Top Boxes (STBs) which in turn present broadcast channels to media devices 1408 such as computers or television sets managed in some instances by a media controller 1407 (such as an infrared or RF remote controller).

The gateway 1404, the media processors 1406, and media devices 1408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies (Bluetooth® and ZigBee® are trademarks registered by the Bluetooth Special Interest Group and the ZigBee Alliance, respectively). By way of these interfaces, unicast communications can also be invoked between the media processors 1406 and subsystems of the IPTV media system for services such as video-on-demand (VoD), browsing an electronic programming guide (EPG), or other infrastructure services.

A satellite broadcast television system 1429 can be used in the media system of FIG. 14. The satellite broadcast television system can be overlaid, operably coupled with, or replace the IPTV system as another representative embodiment of communication system 1400. In this embodiment, signals transmitted by a satellite 1415 that include media content can be received by a satellite dish receiver 1431 coupled to the building 1402. Modulated signals received by the satellite dish receiver 1431 can be transferred to the media processors 1406 for demodulating, decoding, encoding, and/or distributing broadcast channels to the media devices 1408. The media processors 1406 can be equipped with a broadband port to an Internet Service Provider (ISP) network 1432 to enable interactive services such as VoD and EPG as described above.

In yet another embodiment, an analog or digital cable broadcast distribution system such as cable TV system 1433 can be overlaid, operably coupled with, or replace the IPTV system and/or the satellite TV system as another representative embodiment of communication system 1400. In this embodiment, the cable TV system 1433 can also provide Internet, telephony, and interactive media services.

The subject disclosure can apply to other present or next generation over-the-air and/or landline media content services system.

Some of the network elements of the IPTV media system can be coupled to one or more computing devices 1430, a portion of which can operate as a web server for providing web portal services over the ISP network 1432 to wireline media devices 1408 or wireless communication devices 1416.

Communication system 1400 can also provide for computing devices 1430 to function as an LPO platform, an MNO TSM, various other TSMs (e.g., SP TSM), a remote management server and/or an application server (herein referred to as server 1430). The server 1430 can use computing and communication technology to perform function 1462, which can include among other things, separating an LPO SD from the MNO TSD to remove secure channel management associated with transport from the MNO TSM; enabling the MNO TSM to manage applications directly using its own application key while making use of secure transport from the LPO; allowing an SP TSM to operate with Authorized Management while using the same LPO as the MNO TSM; allowing an SP TSM to perform card content management functions subject to permission from the MNO TSM, and so forth.

Function 1466 can include generating and adjusting the security domain of the UICC to provide for separate card management, GP services management and telephony management; adjusting the hierarchy in the GP services management security domain to add an LPO SD, an MNO TSD, an SP LPO SD, an SP TSD, and one or more other SSD root structures with their own hierarchy.

Multiple forms of media services can be offered to media devices over landline technologies such as those described above. Additionally, media services can be offered to media devices by way of a wireless access base station 1417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 15:
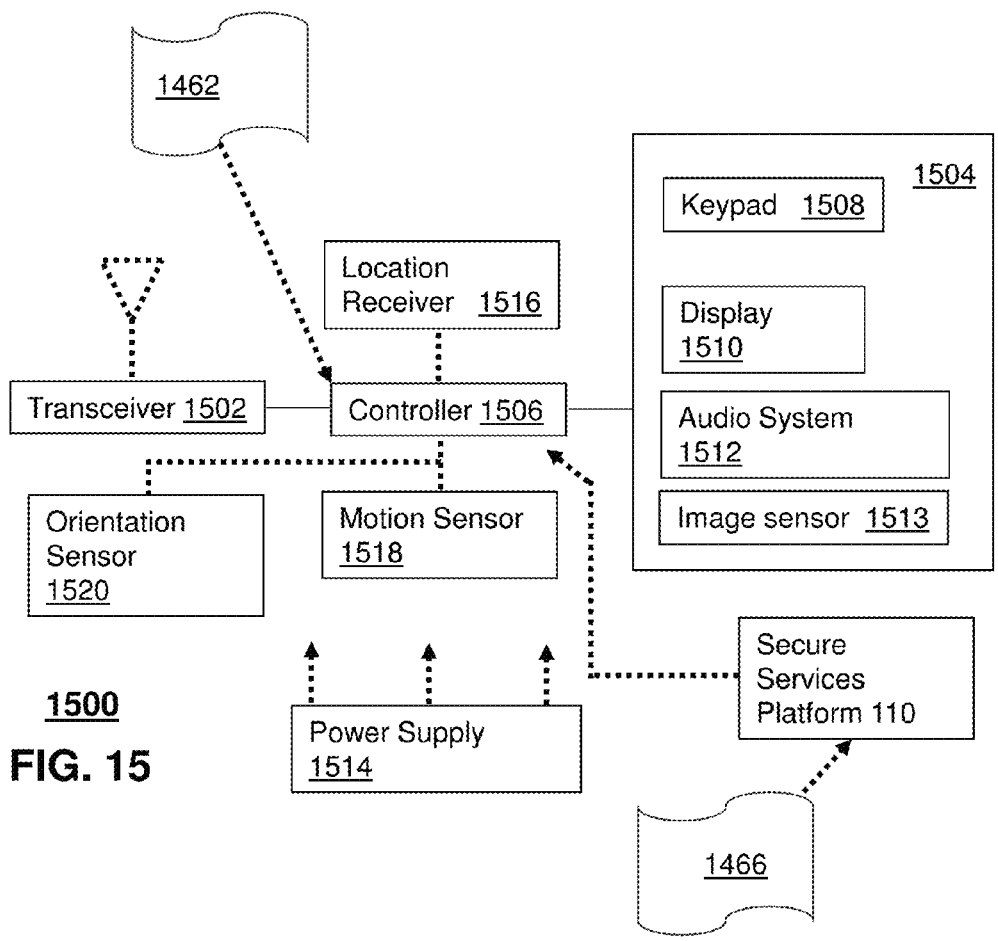
FIG. 15 depicts an illustrative embodiment of a communication device that can provide for secure communications through use of a security domain structure of a UICC.

FIG. 15 depicts an illustrative embodiment of a communication device 1500. Communication device 1500 can serve in whole or in part as an illustrative embodiment of the devices depicted in FIGS. 1-14 and 16. Communication device 1500 can generate an SSD root structure for its UICC (e.g., in the secure services platform 110), where the SSD root structure includes a hierarchy of an LPO SD above an MNO TSD, where the LPO SD enables transport management by an LPO, and where the MNO TSD enables card content management and/or subscription eligibility verification by an MNO TSM. Communication device 1500 can also adjust the SSD root structure to include an SP TSD in the hierarchy below the LPO SD, wherein the SP TSD enables a third party trusted service manager to perform card content management actions without obtaining authorization from the MNO TSM. In one embodiment, the communication device 1500 can adjust the SSD root structure to include another SP TSD in the hierarchy below the MNO TSD, where the other SP TSD enables another third party trusted service manager to perform card content management actions subject to authorization from the MNO TSM. In one embodiment, the communication device 1500 can, responsive to a determination to allow another third party trusted service manager to utilize a third party over-the-air platform, adjust the SSD root structure to include an SP LPO SD in the hierarchy below the MNO TSD and to include a third SP TSD in the hierarchy below the SP LPO SD. In another embodiment, the communication device 1500 can, responsive to a determination to allow another third party trusted service manager to utilize a third party over-the-air platform, generate another SSD root structure that includes a second hierarchy of an SP LPO SD above another SP TSD. In another embodiment, the UICC can include an ISD, a CASD, and a telephony security domain when the SSD root structure is generated. In another embodiment, the LPO SD can utilize a first keyset for first secure transmissions, and the MNO TSD can utilize a second keyset for second secure transmissions. In another embodiment, the UICC can include a CASD, where the SP TSD utilizes a keyset to securely communicate with the third party trusted service manager, and where the keyset is generated by the CASD.

In one embodiment, communication device 1500 can include a secure element (e.g., a UICC) and a secure device processor in the secure services platform 110 which perform the functions described in the exemplary embodiments herein.

To enable these features, communication device 1500 can comprise a wireline and/or wireless transceiver 1502 (herein transceiver 1502), a user interface (UI) 1504, a power supply 1514, a location receiver 1516, a motion sensor 1518, an orientation sensor 1520, and a controller 1506 for managing operations thereof. The transceiver 1502 can support short-range or long-range wireless access technologies such as Bluetooth®, ZigBee®, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, NFC, as well as other next generation wireless communication technologies as they arise. The transceiver 1502 can also be adapted to support circuit-switched wireline access technologies (such as PSTN), packet-switched wireline access technologies (such as TCP/IP, VoIP, and so forth), and combinations thereof.

The UI 1504 can include a depressible or touch-sensitive keypad 1508 with a navigation mechanism such as a roller ball, a joystick, a mouse, or a navigation disk for manipulating operations of the communication device 1500. The keypad 1508 can be an integral part of a housing assembly of the communication device 1500 or an independent device operably coupled thereto by a tethered wireline interface (such as a USB cable) or a wireless interface supporting for example Bluetooth®. The keypad 1508 can represent a numeric keypad commonly used by phones, and/or a QWERTY keypad with alphanumeric keys. The UI 1504 can further include a display 1510 such as monochrome or color LCD (Liquid Crystal Display), OLED (Organic Light Emitting Diode) or other suitable display technology for conveying images to an end user of the communication device 1500. In an embodiment where the display 1510 is touch-sensitive, a portion or all of the keypad 1508 can be presented by way of the display 1510 with navigation features.

The display 1510 can use touch screen technology to also serve as a user interface for detecting user input. As a touch screen display, the communication device 1500 can be adapted to present a user interface with graphical user interface (GUI) elements that can be selected by a user with a touch of a finger. The touch screen display 1510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1510 can be an integral part of the housing assembly of the communication device 1500 or an independent device communicatively coupled thereto by a tethered wireline interface (such as a cable) or a wireless interface.

The UI 1504 can also include an audio system 1512 that utilizes audio technology for conveying low volume audio (such as audio heard in proximity of a human ear) and high volume audio (such as speakerphone for hands free operation). The audio system 1512 can further include a microphone for receiving audible signals of an end user. The audio system 1512 can also be used for voice recognition applications. The UI 1504 can further include an image sensor 1513 such as a charged coupled device (CCD) camera for capturing still or moving images.

The power supply 1514 can utilize common power management technologies such as replaceable and rechargeable batteries, supply regulation technologies, and/or charging system technologies for supplying energy to the components of the communication device 1500 to facilitate long-range or short-range portable applications. Alternatively, or in combination, the charging system can utilize external power sources such as DC power supplied over a physical interface such as a USB port or other suitable tethering technologies.

The location receiver 1516 can utilize location technology such as a global positioning system (GPS) receiver capable of assisted GPS for identifying a location of the communication device 1500 based on signals generated by a constellation of GPS satellites, which can be used for facilitating location services such as navigation. The motion sensor 1518 can utilize motion sensing technology such as an accelerometer, a gyroscope, or other suitable motion sensing technology to detect motion of the communication device 1500 in three-dimensional space. The orientation sensor 1520 can utilize orientation sensing technology such as a magnetometer to detect the orientation of the communication device 1500 (north, south, west, and east, as well as combined orientations in degrees, minutes, or other suitable orientation metrics).

The communication device 1500 can use the transceiver 1502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1500.

Other components not shown in FIG. 15 can be used in one or more embodiments of the subject disclosure. For instance, the communication device 1500 can include a reset button (not shown). The reset button can be used to reset the controller 1506 of the communication device 1500. In yet another embodiment, the communication device 1500 can also include a factory default setting button positioned, for example, below a small hole in a housing assembly of the communication device 1500 to force the communication device 1500 to re-establish factory settings. In this embodiment, a user can use a protruding object such as a pen or paper clip tip to reach into the hole and depress the default setting button. In one embodiment, the communication device 1500 can also include a slot for adding or removing the UICC.

The communication device 1500 as described herein can operate with more or less of the circuit components shown in FIG. 15. These variant embodiments can be used in one or more embodiments of the subject disclosure.

The communication device 1500 can be adapted to perform the functions of the media processor 1406, the media devices 1408, the portable communication devices 1416 and/or the server 1430 of FIG. 14. It will be appreciated that the communication device 1500 can also represent other devices that can operate in communication system 1400 of FIG. 14, such as a gaming console and a media player.

The communication device 1500 shown in FIG. 15 or portions thereof can serve as a representation of one or more of the devices of FIGS. 1-14 and 16 including end user devices, removable memory devices, customer premises equipment, remote management servers, application servers, and so forth. In one or more embodiments, the recipient device can be servers operated by, or otherwise affiliated with, a third party entity that is different from and/or independent of the service provider operating the remote management server. In addition, the controller 1506 can perform the functions 1562 and/or 1566.

Upon reviewing the aforementioned embodiments, it would be evident to an artisan with ordinary skill in the art that said embodiments can be modified, reduced, or enhanced without departing from the scope of the claims described below.

For example, various keysets can be utilized that are re-usable, rotated and/or one-time use keys which are deleted or otherwise rendered inoperable after being applied, such as for encryption, modification, decryption and/or un-modification. In one embodiment, encryption can be applied based on elliptical curve cryptography, Advance Encryption Standard (AES), and so forth. Other encryption techniques can be utilized, including symmetrical and/or asymmetrical cryptographic methods. One or more of the exemplary embodiments enable supporting one or more NFC services from services providers that do not have their own SP TSM for any of the management modes (e.g., simple, delegated and authorized). In one or more embodiments, a system can detect an SP TSM which wishes to operate in either SM or DM, and can then adjust the SSD root structure of a UICC accordingly. In one or more embodiments, a system can make a determination that an SP TSM or an AP/SP has determined to operate in any of the modes (SM, DM, or AM) and can then adjust the SSD root structure or create a new one accordingly.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/ or wired paths that utilize one or more of various protocols or methodologies, where the coupling and/or connection can be direct (e.g., no intervening processing device) and/or indirect (e.g., an intermediary processing device such as a router).

Figure 16:
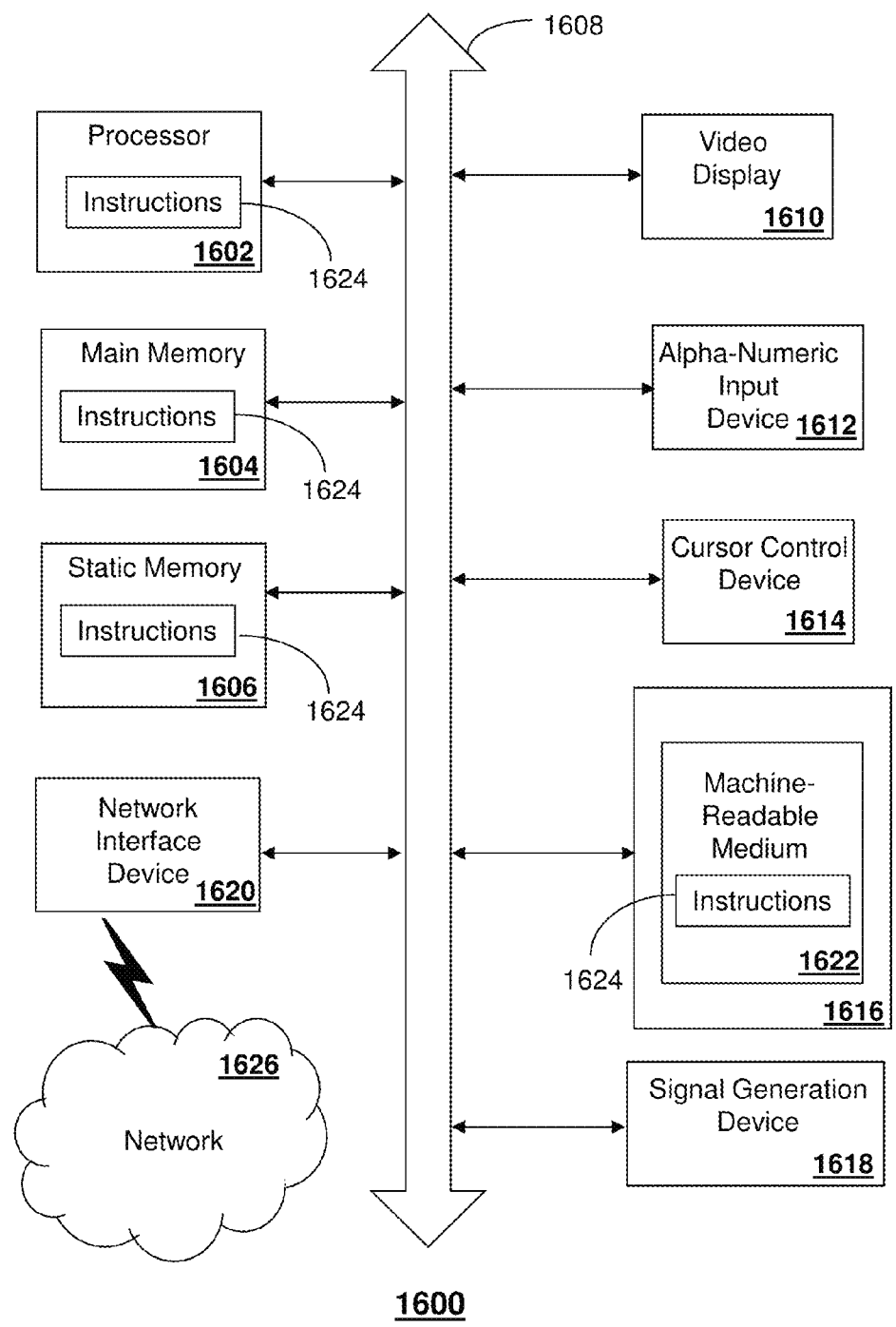
FIG. 16 is a diagrammatic representation of a machine in the form of a computer system within which a set of instructions, when executed, may cause the machine to perform any one or more of the methods described herein.

FIG. 16 depicts an exemplary diagrammatic representation of a machine in the form of a computer system 1600 within which a set of instructions, when executed, may cause the machine to perform any one or more of the methods described above. One or more instances of the machine can provide for generation and adjustment of the UICC to manage security domains. One or more instances of the machine can operate, for example, as the UICC, the mobile communication device, the MNO TSM, the LPO platform (or other equipment of the LPO), the third party service provider trusted services manager, the remote management server, the secure services platform (e.g., the secure element and/or the SDP), the device processor, and so forth. In some embodiments, the machine may be connected (e.g., using a network 1626) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1600 may include a processor (or controller) 1602 (e.g., a central processing unit (CPU)), a graphics processing unit (GPU, or both), a main memory 1604 and a static memory 1606, which communicate with each other via a bus 1608. The computer system 1600 may further include a display unit 1610 (e.g., a liquid crystal display (LCD), a flat panel, or a solid state display). The computer system 1600 may include an input device 1612 (e.g., a keyboard), a cursor control device 1614 (e.g., a mouse), a disk drive unit 1616, a signal generation device 1618 (e.g., a speaker or remote control) and a network interface device 1620. In distributed environments, the embodiments described in the subject disclosure can be adapted to utilize multiple display units 1610 controlled by two or more computer systems 1600. In this configuration, presentations described by the subject disclosure may in part be shown in a first of the display units 1610, while the remaining portion is presented in a second of the display units 1610.

The disk drive unit 1616 may include a tangible computer-readable storage medium 1622 on which is stored one or more sets of instructions (e.g., software 1624) embodying any one or more of the methods or functions described herein, including those methods illustrated above. The instructions 1624 may also reside, completely or at least partially, within the main memory 1604, the static memory 1606, and/or within the processor 1602 during execution thereof by the computer system 1600. The main memory 1604 and the processor 1602 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, and so forth) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "separate" can include a component or device that is logically and/or physically separate from another component or device, which can include components/devices that operate independently of each other while being in communication with each other. In one or more embodiments, devices can be separate in that they do not share any common component (although such separate devices can be in communication with each other such as via an electrode coupling). In one or more embodiments, devices can be separate in that they each have one or more components that are not shared between each other but have one or more components that may be shared with each other.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP, NFC) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®, NFC), and long-range communications (e.g., WiMAX, GSM, CDMA, LTE) can be used by computer system 1600.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
    a universal integrated circuit card;
    a processor; and
    a memory that stores executable instructions that, when executed by the processor, facilitate performance of operations, comprising:
        generating a third-party security domain root structure for the universal integrated circuit card, wherein the third-party security domain root structure includes a hierarchy of a link provider operator security domain above a mobile network operator trusted security domain, and wherein the mobile network operator trusted security domain enables card content management and subscription eligibility verification by equipment of a mobile network operator trusted service manager;
        adjusting the third-party security domain root structure to include a service provider trusted security domain in the hierarchy below the mobile network operator trusted security domain, wherein the service provider trusted security domain enables equipment of a third-party trusted service manager to perform card content management actions subject to authorization from the equipment of the mobile network operator trusted service manager; and
        adjusting the third-party security domain root structure to include another service provider trusted security domain in the hierarchy below the link provider operator security domain, wherein the another service provider trusted security domain enables equipment of another third-party trusted service manager to perform card content management actions without obtaining authorization from the equipment of the mobile network operator trusted service manager.

2. The device of claim 1, wherein the generating the third-party security domain root structure is responsive to receiving an over-the-air message.

3. The device of claim 1, wherein the operations further comprise:
generating a second third-party security domain root structure that includes a second hierarchy of a service provider link provider operator security domain above a second service provider trusted security domain.

4. The device of claim 1, wherein the operations further comprise:
responsive to a determination to allow the third-party trusted service manager to utilize a third-party over-the-air platform, adjusting the third-party security domain root structure to include a service provider link provider operator security domain in the hierarchy below the mobile network operator trusted security domain and to include a second service provider trusted security domain in the hierarchy below the service provider link provider operator security domain.

5. The device of claim 1, wherein the operations further comprise:
determining to operate in an authorized management dual mode, wherein the adjusting the third-party security domain root structure to include the another service provider trusted security domain in the hierarchy below the link provider operator security domain is responsive to the determining to operate in the authorized management dual mode.

6. The device of claim 1, wherein the universal integrated circuit card comprises an issuer security domain, a controlling authority security domain, and a telephony security domain when the third-party security domain root structure is generated.

7. The device of claim 1, wherein the link provider operator security domain utilizes a first keyset for first secure transmissions, and wherein the mobile network operator trusted security domain utilizes a second keyset for second secure transmissions.

8. The device of claim 1, wherein the universal integrated circuit card comprises a controlling authority security domain and a service provider trusted security domain, wherein the service provider trusted security domain utilizes a keyset to securely communicate with equipment of a third-party trusted service manager, and wherein the keyset is generated by the controlling authority security domain.

9. A universal integrated circuit card comprising:
a memory that stores executable instructions that, when executed by a processor, facilitate performance of operations, comprising:
generating a third-party security domain root structure for the universal integrated circuit card, wherein the third-party security domain root structure includes a hierarchy of a link provider operator security domain above a mobile network operator trusted security domain, and wherein the mobile network operator trusted security domain enables card content management and subscription eligibility verification by equipment of a mobile network operator trusted service manager;
responsive to an instruction received from the equipment of the mobile network operator trusted service manager, adjusting the third-party security domain root structure to include a service provider trusted security domain in the hierarchy below the mobile network operator trusted security domain, wherein the service provider trusted security domain enables equipment of a third-party trusted service manager to perform card content management actions subject to authorization from the equipment of the mobile network operator trusted service manager; and
adjusting the third-party security domain root structure to include a second service provider trusted security domain in the hierarchy below the link provider operator security domain, wherein the second service provider trusted security domain enables equipment of another third-party trusted service manager to perform card content management actions without obtaining authorization from the equipment of the mobile network operator trusted service manager.

10. The universal integrated circuit card of claim 9, wherein the generating the third-party security domain root structure is responsive to receiving an over-the-air message.

11. The universal integrated circuit card of claim 9, wherein the operations further comprise:
responsive to a determination to allow another third-party trusted service manager to utilize a third-party over-the-air platform, adjusting the third-party security domain root structure to include a service provider link provider operator security domain in the hierarchy below the mobile network operator trusted security domain and to include a third service provider trusted security domain in the hierarchy below the service provider link provider operator security domain.

12. The universal integrated circuit card of claim 9, wherein the processor comprises a plurality of processors operating in a distributed processing environment of an end user device.

13. The universal integrated circuit card of claim 9, comprising an issuer security domain, a controlling authority security domain, and a telephony security domain when the third-party security domain root structure is generated.

14. The universal integrated circuit card of claim 9, wherein the link provider operator security domain utilizes a first keyset for first secure transmissions, and wherein the mobile network operator trusted security domain utilizes a second keyset for second secure transmissions.

15. The universal integrated circuit card of claim 9, comprising a controlling authority security domain, wherein the service provider trusted security domain utilizes a keyset to securely communicate with the equipment of the third-party trusted service manager, and wherein the keyset is generated by the controlling authority security domain.

16. A method, comprising:
determining, by a server including a processing system, to operate a universal integrated circuit card of an end user device in a delegated mode, wherein the universal integrated circuit card has a third-party security domain root structure with a hierarchy including a link provider operator security domain in the hierarchy above a mobile network operator trusted security domain;
responsive to the determining to operate in the delegated mode, causing, by the server, the third-party security domain root structure of the universal integrated circuit card to add a service provider trusted security domain in the hierarchy below the mobile network operator trusted security domain; and
receiving, by the server, a request from a third-party trusted service manager to perform a card content management action, wherein the service provider trusted security domain enables the third-party trusted service manager to perform the card content management action via the service provider trusted security domain, wherein the third-party security domain root structure is selectively adjustable to include the service provider trusted security domain in the hierarchy below the link provider operator security domain, wherein the service provider trusted security domain enables a third-party trusted service manager to perform card content management actions without obtaining authorization from the mobile network operator trusted service manager.

17. The method of claim 16, wherein the third-party security domain root structure is selectively adjustable to include a service provider link provider operator security domain in the hierarchy below the mobile network operator trusted security domain and to include a second service provider trusted security domain in the hierarchy below the service provider link provider operator security domain.

18. The method of claim 16, wherein the third-party security domain root structure is selectively adjustable to include the service provider trusted security domain in the hierarchy below the link provider operator security domain responsive to a determination to operate in an authorized management dual mode.

19. The method of claim 16, wherein the universal integrated circuit card comprises an issuer security domain, a controlling authority security domain, and a telephony security domain when the third-party security domain root structure is generated.

20. The method of claim 16, wherein the universal integrated circuit card comprises a controlling authority security domain, wherein the service provider trusted security domain utilizes a keyset to securely communicate with the third-party trusted service manager, and wherein the keyset is generated by the controlling authority security domain.

* * * * *